United States Patent
Zhou et al.

(10) Patent No.: US 9,998,930 B2
(45) Date of Patent: Jun. 12, 2018

(54) ANCHOR ASSISTED COMMUNICATION CHANNEL HOPPING

(71) Applicant: QUALCOMM Incorporated, San Diego, CA (US)

(72) Inventors: Yan Zhou, San Diego, CA (US); George Cherian, San Diego, CA (US); Simone Merlin, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 14/714,115

(22) Filed: May 15, 2015

(65) Prior Publication Data

US 2016/0337873 A1 Nov. 17, 2016

(51) Int. Cl.
*H04W 24/02* (2009.01)
*H04W 36/00* (2009.01)
*H04W 8/00* (2009.01)

(52) U.S. Cl.
CPC ....... *H04W 24/02* (2013.01); *H04W 36/0061* (2013.01); *H04W 8/005* (2013.01)

(58) Field of Classification Search
CPC ..... H04W 8/005; H04W 16/14; H04W 16/16; H04W 16/32; H04W 24/02; H04W 24/04; H04W 28/0205; H04W 36/00; H04W 36/0061; H04W 36/08; H04W 36/34
See application file for complete search history.

(56) References Cited

U.S. PATENT DOCUMENTS

| 7,379,447 | B2 | 5/2008 | Dunagan et al. |
| 8,427,942 | B2 | 4/2013 | Kim et al. |
| 2004/0039817 | A1 | 2/2004 | Lee et al. |
| 2005/0272435 | A1* | 12/2005 | Tsien ...................... G01S 7/021 455/450 |
| 2007/0211623 | A1 | 9/2007 | Nishioka |
| 2009/0052382 | A1* | 2/2009 | Stephenson ........... H04W 16/14 370/329 |
| 2010/0273432 | A1 | 10/2010 | Meshkati et al. |
| 2011/0250858 | A1 | 10/2011 | Jain et al. |
| 2013/0135995 | A1 | 5/2013 | Wu et al. |
| 2013/0242905 | A1 | 9/2013 | Rasband et al. |
| 2014/0199996 | A1 | 7/2014 | Wang et al. |
| 2015/0049624 | A1 | 2/2015 | Sun et al. |
| 2015/0288809 | A1 | 10/2015 | Liang et al. |

(Continued)

OTHER PUBLICATIONS

Partial International Search Report—PCT/US2016/031342—ISA/EPO—dated Oct. 12, 2016.

(Continued)

*Primary Examiner* — Khoa Huynh
(74) *Attorney, Agent, or Firm* — Arent Fox, LLP

(57) ABSTRACT

A method, an apparatus, and a computer program product for wireless communication are provided. In one implementation, an apparatus includes a processing system configured to receive information related to a first device, wherein the information includes an indication that the first device is configured to change its operating channel, exclude the first device from an available device list in a neighbor report in response to receiving the indication that the first device is configured to change its operating channel, and output the neighbor report for transmission to a second device.

24 Claims, 14 Drawing Sheets

(56) References Cited

U.S. PATENT DOCUMENTS

2016/0174088 A1 6/2016 Yilmaz et al.
2016/0338060 A1 11/2016 Zhou
2016/0338086 A1 11/2016 Zhou

OTHER PUBLICATIONS

Tan P., et al., "AMCM: Adaptive Multi-Channel MAC Protocol for IEEE 802.11 Wireless Networks," 3rd International Conference on Broadband Communications, Networks and Systems, 2006, pp. 1-10.

* cited by examiner

ANCHOR ASSISTED COMMUNICATION CHANNEL HOPPING

BACKGROUND

Field of the Disclosure

The present disclosure relates generally to communication systems, and more particularly, to facilitating association between a station and a channel-hopping access point (AP).

Description of Related Art

In many telecommunication systems, communication networks are used to exchange messages among several interacting spatially-separated devices. Networks may be classified according to geographic scope, which could be, for example, a metropolitan area, a local area, or a personal area. Such networks may be designated as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, IEEE 802.11, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, or other frequency bands. Wireless networks advantageously facilitate user mobility and rapid field deployment when compared to fixed wired networks. The various advantages provided by wireless networks lead to high levels of wireless network usage. As the usage levels of wireless networks increase, some network resources may become heavily loaded, thereby reducing network performance during the overload conditions. Thus, a need exists for networking strategies and implementations that may increase capacity and/or performance in wireless networks.

SUMMARY

The systems, methods, and devices of the present disclosure each have several aspects and features. Without limiting the scope of the claims which follow, some features will now be discussed briefly. After considering this discussion, and particularly after reading the section entitled "Detailed Description," one will understand how the features of the present disclosure provide advantages related to the performance of anchor assisted communication channel hopping.

One aspect of this disclosure provides an apparatus for wireless communication including a processing system configured to attempt communication with a first device via a first channel, connect with a second device associated with the first device in response to a determination that communication with the first device was unsuccessful on the first channel, and receive channel information associated with the first device from the second device, wherein the channel information indicates a second channel used by the first device.

Another aspect of this disclosure provides a method of wireless communication at an apparatus. The method includes attempting communication with a first device via a first channel, connecting with a second device associated with the first device in response to a determination that communication with the first device was unsuccessful on the first channel, and receiving channel information associated with the first device from the second device, wherein the channel information indicates a second channel used by the first device.

A further aspect of this disclosure provides an apparatus for wireless communication including means for attempting communication with a first device via a first channel, means for connecting with a second device associated with the first device in response to a determination that communication with the first device was unsuccessful on the first channel, and means for receiving channel information associated with the first device from the second device, wherein the channel information indicates a second channel used by the first device.

Yet another aspect of this disclosure provides a computer-readable medium storing computer executable code for wireless communication at an apparatus. The computer-readable medium includes code for attempting communication with a first device via a first channel, connecting with a second device associated with the first device in response to a determination that communication with the first device was unsuccessful on the first channel, and receiving channel information associated with the first device from the second device, wherein the channel information indicates a second channel used by the first device Yet a further aspect of this disclosure provides for a station for wireless communication including at least one antenna, and a processing system coupled to the at least one antenna. The processing system is configured to attempt, via the at least one antenna, communication with a first device via a first channel, connect, via the at least one antenna, with a second device associated with the first device in response to a determination that communication with the first device was unsuccessful on the first channel, and receive, via the at least one antenna, channel information associated with the first device from the second device, wherein the channel information indicates a second channel used by the first device.

One aspect of this disclosure provides for an apparatus for wireless communication including a processing system configured to receive information related to a first device, wherein the information includes an indication that the first device is configured to change its operating channel, exclude the first device from an available device list in a neighbor report in response to receiving the indication that the first device is configured to change its operating channel, and output the neighbor report for transmission to a second device.

Another aspect of this disclosure provides for a method of wireless communication at an apparatus. The method includes receiving information related to a first device, wherein the information includes an indication that the first device is configured to change its operating channel, excluding the first device from an available device list in a neighbor report in response to receiving the indication that the first device is configured to change its operating channel, and outputting the neighbor report for transmission to a second device.

A further aspect of this disclosure provides for an apparatus for wireless communication including means for receiving information related to a first device, wherein the information includes an indication that the first device is configured to change its operating channel, means for excluding the first device from an available device list in a neighbor report in response to receiving the indication that the first device is configured to change its operating channel, and means for outputting the neighbor report for transmission to a second device.

Yet another aspect of this disclosure provides for a computer-readable medium storing computer executable code for wireless communication at an apparatus. The computer-readable medium includes code for receiving information related to a first device, wherein the information includes an indication that the first device is configured to change its operating channel, excluding the first device from an available device list in a neighbor report in response to receiving the indication that the first device is configured to change its operating channel, and outputting the neighbor report for transmission to a second device.

Yet a further aspect of this disclosure provides for an access point for wireless communication including at least one antenna, and a processing system coupled to the at least one antenna. The processing system is configured to receive, via the at least one antenna, information related to a first device, wherein the information includes an indication that the first device is configured to change its operating channel, exclude, via the at least one antenna, the first device from an available device list in a neighbor report in response to receiving the indication that the first device is configured to change its operating channel, and output, via the at least one antenna, the neighbor report for transmission to a second device.

One aspect of this disclosure provides an apparatus for wireless communication including a processing system. The processing system is configured to receive a request from a first device, the request requesting channel information regarding a second device associated with the apparatus. The processing system is further configured to transmit the channel information regarding the second device to the first device to indicate a channel used by the second device and to facilitate an attempt by the first device to communicate with the second device via the indicated channel.

Another aspect of this disclosure provides a method of wireless communication at an apparatus. The method includes receiving a request from a first device, the request requesting channel information regarding a second device associated with the apparatus. The method further includes transmitting the channel information regarding the second device to the first device to indicate a channel used by the second device and to facilitate an attempt by the first device to communicate with the second device via the indicated channel.

A further aspect of this disclosure provides an apparatus for wireless communication. The apparatus includes means for receiving a request from a first device, the request requesting channel information regarding a second device associated with the apparatus. The apparatus further includes means for transmitting the channel information regarding the second device to the first device to indicate a channel used by the second device and to facilitate an attempt by the first device to communicate with the second device via the indicated channel.

Yet another aspect of this disclosure provides a computer-readable medium storing computer executable code for wireless communication at an apparatus. The computer-readable medium includes code for receiving a request from a first device, the request requesting channel information regarding a second device. The computer-readable medium further includes code for transmitting the channel information regarding the second device to indicate a channel used by the second device and to facilitate an attempt by the first device to communicate with the second device via the indicated channel.

Yet a further aspect of this disclosure provides for an access point for wireless communication. The access point includes at least one antenna and a processing system coupled to the at least one antenna. The processing system is configured to receive, via the at least one antenna, a request from a first device, the request requesting channel information regarding a second device, and transmit, via the at least one antenna, the channel information regarding the second device to the first device to indicate a channel used by the second device and to facilitate an attempt by the first device to communicate with the second device via the indicated channel.

One aspect of this disclosure provides an apparatus for wireless communication including a processing system. The processing system is configured to transmit a scanning schedule to one or more devices. The scanning schedule includes one or more candidate channels and a scan period corresponding to at least a first device of the one or more devices. The processing system is further configured to receive a report from the first device in response to the scanning schedule. The report indicates a load on at least one of the one or more candidate channels during the scan period.

Another aspect of this disclosure provides a method of wireless communication at an apparatus. The method includes transmitting a scanning schedule to one or more devices, the scanning schedule comprising one or more candidate channels and a scan period corresponding to at least a first device of the one or more devices, and receiving a report from the first device in response to the scanning schedule. The report indicates a load on at least one of the one or more candidate channels during the scan period.

A further aspect of this disclosure provides an apparatus for wireless communication. The apparatus includes means for transmitting a scanning schedule to one or more devices, the scanning schedule comprising one or more candidate channels and a scan period corresponding to at least a first device of the one or more devices, and means for receiving a report from the first device in response to the scanning schedule. The report indicates a load on at least one of the one or more candidate channels during the scan period.

Yet another aspect of this disclosure provides a computer-readable medium storing computer executable code for wireless communication at an apparatus. The computer-readable medium includes code for transmitting a scanning schedule to one or more devices, the scanning schedule comprising one or more candidate channels and a scan period corresponding to at least a first device of the one or more devices, and receiving a report from the first device in response to the scanning schedule. The report indicates a load on at least one of the one or more candidate channels during the scan period.

Yet a further aspect of this disclosure provides an access point for wireless communication. The access point includes at least one antenna and a processing system coupled to the at least one antenna. The processing system is configured to transmit, via the at least one antenna, a scanning schedule to one or more devices, the scanning schedule comprising one or more candidate channels and a scan period corresponding to at least a first device of the one or more devices, and receive, via the at least one antenna, a report from the first device in response to the scanning schedule. The report indicates a load on at least one of the one or more candidate channels during the scan period.

One aspect of this disclosure provides an apparatus for wireless communication. The apparatus includes a processing system configured to receive a scanning schedule from a device, the scanning schedule comprising one or more candidate channels and a scan period corresponding to the apparatus, measure a load on at least one of the one or more candidate channels during the scan period in response to receipt of the scanning schedule, and report the measured load on at least one of the one or more candidate channels to the device.

Another aspect of this disclosure provides a method of wireless communication at an apparatus. The method includes receiving a scanning schedule from a device, the scanning schedule comprising one or more candidate channels and a scan period corresponding to the apparatus, measuring a load on at least one of the one or more candidate channels during the scan period in response to receipt of the scanning schedule, and reporting the measured load on at least one of the one or more candidate channels to the device.

A further aspect of this disclosure provides an apparatus for wireless communication. The apparatus includes means for receiving a scanning schedule from a device, the scanning schedule comprising one or more candidate channels and a scan period corresponding to the apparatus, means for measuring a load on at least one of the one or more candidate channels during the scan period in response to receipt of the scanning schedule, and means for reporting the measured load on at least one of the one or more candidate channels to the device.

Yet another aspect of this disclosure provides a computer-readable medium storing computer executable code for wireless communication at an apparatus. The computer-readable medium includes code for receiving a scanning schedule from a device, the scanning schedule comprising one or more candidate channels and a scan period corresponding to the apparatus, measuring a load on at least one of the one or more candidate channels during the scan period in response to receipt of the scanning schedule, and reporting the measured load on at least one of the one or more candidate channels to the device.

Yet another aspect of this disclosure provides a station for wireless communication. The station includes at least one antenna and a processing system coupled to the at least one antenna. The processing system is configured to receive, via the at least one antenna, a scanning schedule from a device, the scanning schedule comprising one or more candidate channels and a scan period corresponding to the apparatus, measure a load on at least one of the one or more candidate channels during the scan period in response to receipt of the scanning schedule, and report, via the at least one antenna, the measured load on at least one of the one or more candidate channels to the device.

DETAILED DESCRIPTION

Figure 1:
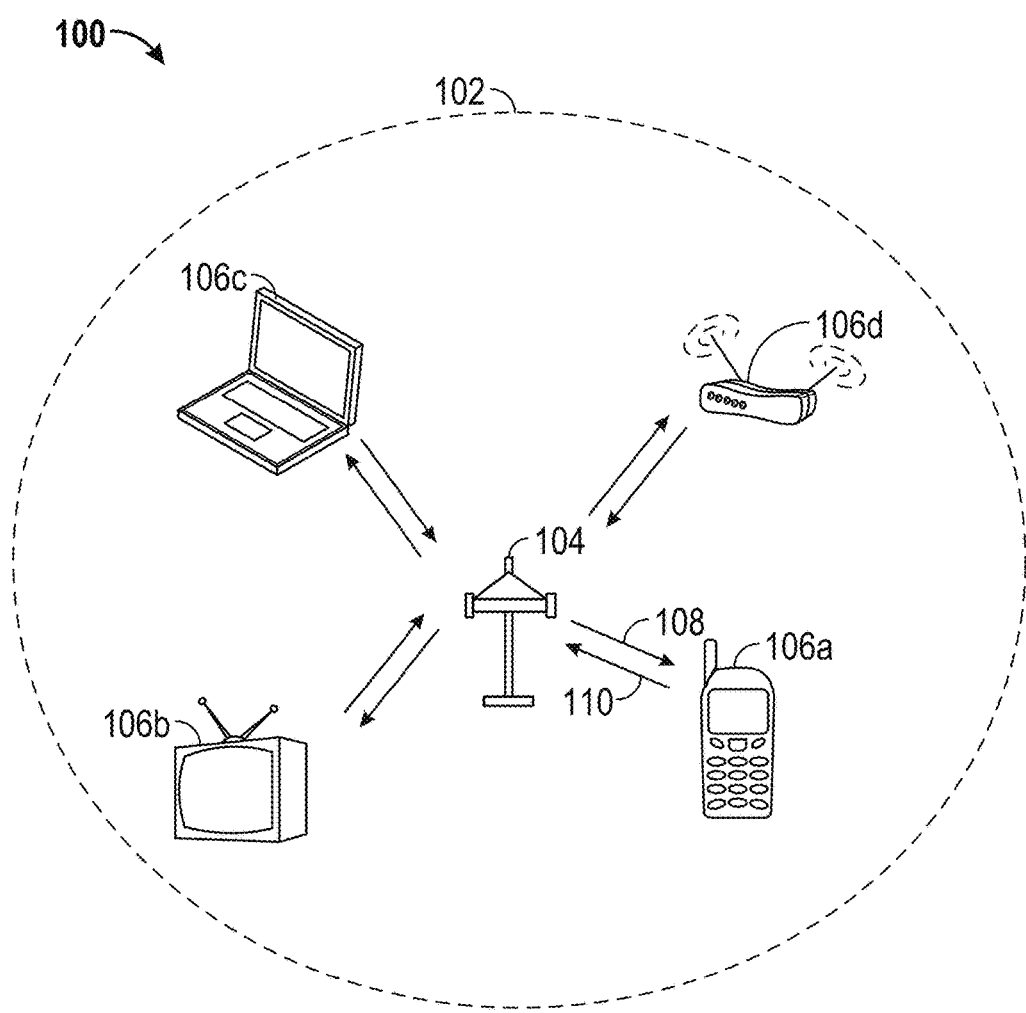
FIG. 1 shows an example wireless communication system in which aspects of the present disclosure may be employed.

The present disclosure describes various communication channel hopping features and implementations that may improve performance of wireless networks. The channel hopping techniques disclosed herein may be used, as one example, in a wireless network that includes an access point (AP) communicating with one or more stations (STAs). During a time in which the AP has insufficient medium usage (MU) (e.g., due to heavy loads and contention), there could be a lightly loaded channel that is available and that is different than the AP's current operating channel. The AP can exploit this available bandwidth (e.g., a short-term "frequency hole") by quickly hopping to the lightly loaded channel by transitioning its operating channel from its previous heavily loaded channel to the new lightly loaded channel.

However, various issues may potentially appear when the AP changes its primary channel. As a first example issue, a new STA may fail to find the hopping AP on the new channel because the STA may have acquired outdated information from a third party that indicates the AP's use of the old channel. As a second example issue, a STA may fail to hop to the new channel selected by the AP due to the STA missing a hopping schedule broadcasted by the hopping AP. In this situation, the STA may have been in a sleep mode during the broadcast, there may have been a decoding error, or the STA may have been the subject of a later hand-in transfer. As a third example issue, two hopping APs may collide when they both try to transition to the same new channel.

Each of these potential issues may be mitigated through use of an anchor AP to assist the hopping AP. In some implementations, the anchor AP may remain on a long-term stationary primary channel. The anchor AP's use of the long-term stationary channel may provide a stable interface to exchange information about the hopping AP with other nodes. Thus, with the assistance of the anchor AP, the hopping AP is free to move between multiple different channels on a short-term basis with reduced likelihood of causing the issues discussed above. For example, while the hopping AP is moving around the available channels, the hopping AP keeps the anchor AP informed of its current channel. The anchor AP remains available on a more consistent channel to provide status and location information about the hopping AP to other nodes interested in the operation of the hopping AP. Additional details regarding the hopping AP, the anchor AP, associated STAs, and other network nodes will be discussed in more detail below.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of specific aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the disclosed aspects. The detailed description and drawings are merely illustrative of the disclosure rather than limiting, the scope of the disclosure being defined by the appended claims and equivalents thereof.

The channel hopping techniques disclosed herein may be used on many different types of wireless network technologies. One such network may be a wireless local area network (WLAN). A WLAN may be used to interconnect nearby devices together, employing networking protocols. The various aspects described herein may apply to any communication standard, such as a wireless protocol.

In some implementations, wireless signals in a WLAN may be transmitted according to an IEEE 802.11 protocol. The signals may be transmitted using orthogonal frequency-division multiplexing (OFDM), orthogonal frequency-division multiple access (OFDMA), direct-sequence spread spectrum (DSSS) communications, a combination of OFDM and DSSS communications, or other schemes. Implementations of the 802.11 protocol may be used for sensors, metering, smart grid networks, consumer electronics, healthcare devices, security systems, and/or process automation. In some implementations, certain devices implementing the 802.11 protocol may consume less power than devices implementing other wireless protocols. Additionally, these 802.11 devices may be used to transmit wireless signals across a relatively long range, for example, about one kilometer or longer.

In some implementations, a WLAN includes various devices which are the components that access the wireless network. For example, the network may include access points ("APs") and clients (also referred to as stations, or "STAs"). In general, an AP may serve as a hub or base station for the WLAN and a STA serves as a user of the WLAN. For example, a STA may be a computer, laptop computer, a tablet computer, a personal digital assistant (PDA), a mobile phone (e.g., a "smartphone"), an Internet of Things ("IoT") device, or another type of electronic communication device. In an example, a STA connects to an AP via a WiFi (e.g., IEEE 802.11 protocol) compliant wireless link to obtain general connectivity to the Internet or to other wide area networks. In some implementations a STA may also be used as an AP, such a device operating as a Software enabled Access Point ("SoftAP").

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communications.

FIG. 1 shows an example wireless communication system 100 in which aspects of the present disclosure may be employed. The wireless communication system 100 may operate pursuant to a wireless standard, for example the 802.11 standard. The wireless communication system 100 may include an AP 104, which communicates with STAs 106 (e.g., including STA 106a, STA 106b, STA 106c, and STA 106d, as shown in FIG. 1).

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with Code Division Multiple Access (CDMA) techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel. DL communications may include unicast or multicast traffic indications.

The AP 104 may suppress adjacent channel interference (ACI) so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP (e.g., the AP 104), but rather may function as a peer-to-peer network between the STAs 106. Accordingly, the functions of the AP 104 described herein may alternatively be performed by one or more of the STAs 106.

The AP 104 may transmit a beacon signal (or simply a "beacon") on one or more channels (e.g., multiple channels, each channel including a frequency bandwidth), via a communication link such as the downlink 108, to other nodes (e.g., the STAs 106 of the wireless communication system 100). The beacon signal may help the other nodes to synchronize their timing with the AP 104, or may provide other information or functionality. Such beacons may be transmitted periodically. The period between successive transmissions may be referred to as a superframe. Transmission of a beacon may be divided into a number of groups or intervals. The beacon may include, but is not limited to, such information as timestamp information to set a common clock, a peer-to-peer network identifier, a device identifier, capability information, a superframe duration, transmission direction information, reception direction information, a neighbor list (or neighbor report), and/or an extended neighbor list, some of which are described in additional detail below. Thus, a beacon may include information both common (e.g., shared) amongst several devices, and information specific to a given device.

In some implementations, a STA 106 may be required to associate with the AP 104 in order to send communications to and/or receive communications from the AP 104. Information for associating may be included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some implementations, the AP 104 may use backhaul services, for example, to communicate with a larger network, such as the Internet or a public switched telephone network (PSTN).

Figure 2:
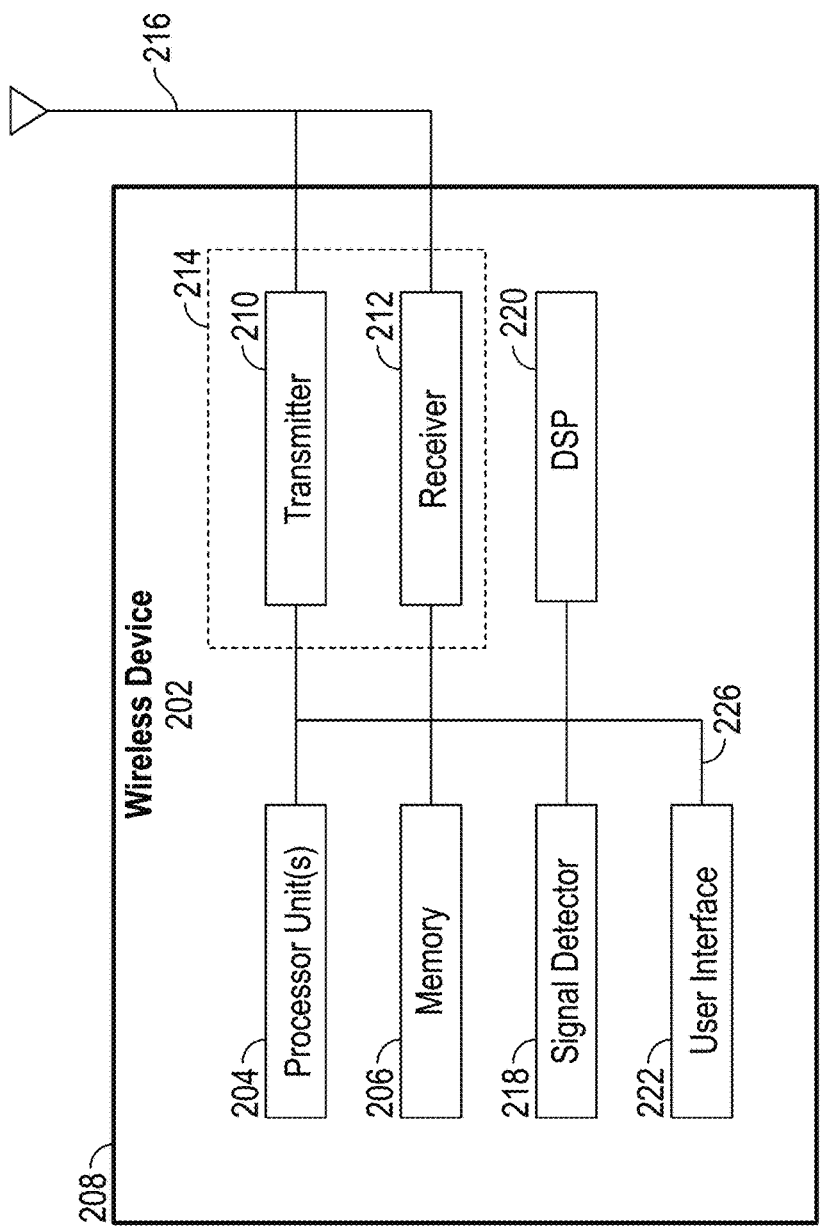
FIG. 2 shows a functional block diagram of an example wireless device that may be employed within the wireless communication system of FIG. 1.

FIG. 2 shows an example functional block diagram of a wireless device 202 that may be employed within the wireless communication system 100 of FIG. 1. The wireless device 202 is an example of a device that may be configured to implement the various methods described herein. For example, the wireless device 202 may serve as the AP 104 or as one of the STAs 106 in the context of the system of FIG. 1. Specifically, the wireless device 202 may be a "hopping" AP, an "anchor" AP, or a STA communicating with the hopping AP and/or the anchor AP, as discussed herein.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable by the processor 204 to implement the anchor assisted channel hopping methods described herein.

The processor 204 may comprise, or be a component of, a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. In one implementation, the processor 204 may be a specialized processor with an architecture customized for the operational needs of an AP providing WLAN services or a STA communicating over a WLAN.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein. For example, the instructions stored on the memory 206 may include instructions programmed specifically for the particular anchor assisted channel hopping functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. The packet may comprise a physical layer data unit (PPDU).

The wireless device 202 may further comprise a user interface 222 in some implementations. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise an AP 104 or a STA 106, and may be used to transmit and/or receive various communications including polling messages, beacon signals, or paging messages, for example. That is, either AP 104 or STA 106 may serve as transmitter or receiver of polling messages, beacon signals, or paging messages. The signal detector 218 may be used by software running on memory 206 and processor 204 to detect the presence of a transmitter or receiver. The AP 104 and STA 106 may receive or transmit messages on one or more channels for communication.

The STA 106 (FIG. 1) may have a plurality of operational modes. For example, the STA 106 may have a first operational mode referred to as an active mode. In the active mode, the STA 106 may be in an "awake" state and actively transmit/receive data with the AP 104. Further, the STA 106 may have a second operational mode referred to as a power save mode. In the power save mode, the STA 106 may be in the "awake" state or a "doze" or "sleep" state where the STA 106 does not actively transmit/receive data with the AP 104. For example, the receiver 212, DSP 220, and/or signal detector 218 of the STA 106 may operate using reduced power consumption in the power save mode. Further, in the power save mode, the STA 106 may occasionally enter the awake state to listen to messages from the AP 104 (e.g., paging messages configured to indicate to wireless devices whether or not the wireless devices have traffic pending and buffered at another device) that indicate to the STA 106 whether or not the STA 106 needs to "wake up" (e.g., enter the awake state) at a certain time so as to be able to transmit/receive data with the AP 104.

Figure 3A:
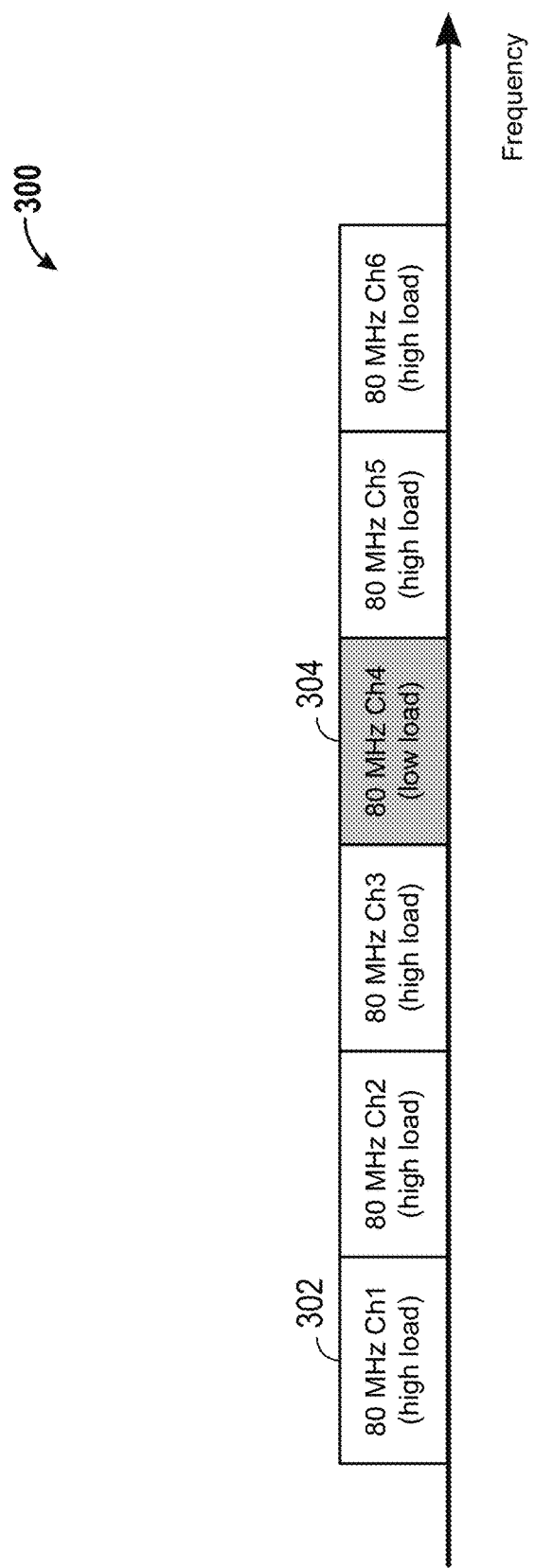
FIG. 3A is a diagram illustrating medium usage (MU) levels for one example set of wireless channels.

FIG. 3A is a diagram 300 illustrating medium usage (MU) levels for one example set of wireless channels. In some implementations, when an AP's operating channel experiences high load, the AP may insufficiently use its resource medium (insufficient MU). However, other channels outside of the AP's operating channel may exist that experience low load, and which the AP may use. For example, referring to FIG. 3A, the AP may operate on a first 80 MHz channel 302 (80 MHz Ch1). While using channel 302, the AP may experience insufficient MU due to high contention with nodes of an overlapping basic service set (OBSS). Accordingly, the AP may look to one of the five other 80 MHz channels of an entire WiFi bandwidth to assess whether one of the other channels currently experiences, and/or will continue to experience (e.g., for a predetermined time period, such as for the next ten minutes), a light load. The AP may then change its current operating channel (e.g., channel 302, 80 MHZ Ch1) by hopping to a lightly loaded channel to exploit the short-term "frequency hole" (lightly loaded channel). As shown in FIG. 3A, the fourth 80 MHz channel 304 (80 MHz Ch4) has been identified as having a light load. Accordingly, the AP may hop to channel 304, and operate on channel 304 for as long as the channel experiences the light load. Although FIG. 3A illustrates one example using 80 MHz channels, the anchor assisted channel hopping techniques disclosed herein may also be used in other size channels, such as 20 MHz channels, 40 MHz channels, 160 MHz channels, etc. Furthermore, in some implementations, the anchor assisted channel hopping techniques disclosed herein may also be used within sub-portions (e.g., tone blocks) of a full channel.

Previous channel allocation techniques may not be able to change an operating channel quickly to exploit short-term frequency holes outside of an AP's current operating channel. In one example allocation technique, such as long-term primary channel selection, the AP's selected primary channel may not change for a long period of time. For example, the selected primary channel may not change for at least several hours, or may even remain fixed after AP setup. The relatively fixed nature of the selected channel with this technique helps mobility in that one AP can better track and identify the primary channel of neighbor APs in a neighbor report. STAs use the neighbor report to quickly find neighbor APs for handover. However, using the long-term primary channel selection technique may not help with exploiting the short-term "frequency hole" situation where alternative channels may provide a lower load level since the primary channel cannot be changed frequently (e.g., may not be able to change every few minutes).

In another example allocation technique, such as a physical layer data unit (PPDU) frequency division multiplexing (FDM) transmission opportunity (TXOP) hopping technique, if the AP on the primary channel detects an OBSS PPDU not using an entire bandwidth of another AP's operating channel, the AP may transmit on a portion of the bandwidth not used by the PPDU in the duration of the PPDU. However, it may be difficult for the AP to hop outside of a current operating channel to exploit out-of-band frequency holes since doing so may require changing an analog filter, which may not be done quickly (e.g., within the duration of the OBSS PPDU).

In some implementations, the present disclosure improves upon the previous hopping techniques by providing an AP ("hopping AP") that is able to change primary channels on a short-term basis (e.g., every few minutes) to exploit frequency holes of an entire bandwidth. These implementations mitigate issues related to primary channel hopping by using an anchor AP having a long-term stationary primary channel, which provides a stable interface for exchanging information about the hopping AP with other nodes. The anchor AP may be co-located with the hopping AP. As one example, the hopping AP and the anchor AP may be physically located within the same AP housing structure, such as within the housing 208 of FIG. 2. As another example, the hopping AP and the anchor AP may be physically separated in different devices but are positioned and configured to have an overlapping service area.

In one implementation, if two co-located APs are provided, one AP may be a hopping AP operating on a first channel, and the other AP may be an anchor AP operating on a second channel that is different than the first channel. The second channel may be in a different bandwidth than the second channel. For example, the first channel may be a channel in the 5 GHz spectrum and the second channel may be a channel in the 2.4 GHz spectrum. Alternative examples may use two different channels selected from other spectrum ranges, such as any of the 900 MHz, 2.4 GHz, 3.6 GHz, 4.9 GHz, 5 GHz, 5.9 GHz, and 60 GHz frequency bands. Other examples may use spectrum ranges outside of traditional WLAN frequency bands. The hopping AP may be able to perform short-term primary channel hopping, e.g., after a predetermined minimum interval (e.g., one minute, two minutes, three minutes, five minutes, or some other predetermined threshold). The hopping AP may hop to a primary channel across an entire WiFi bandwidth or even to a non-WiFi bandwidth. The minimum interval may be short enough to exploit short-term frequency holes but also long enough to reduce time overhead due to channel hopping and scanning. For example, the minimum interval may be selected so that the time overhead may be kept to less than 1%, 2%, 3%, 5%, or some other predetermined overhead threshold.

As stated above, the anchor AP with the long-term stationary primary channel may help resolve issues related to changing the primary channel of the hopping AP during operation. For example, when the hopping AP performs primary channel hopping, new STAs receiving an OBSS AP's neighbor report (NR) may fail to find the hopping AP if the NR includes outdated primary channel information for the hopping AP. Accordingly, a STA may be redirected to the hopping AP on the hopping AP's new channel via an anchor AP's up-to-date neighbor report. Alternatively, an OBSS AP may exclude the hopping AP from the OBSS AP's neighbor report such that the STA will not know to search for the hopping AP upon receiving the OBSS AP's neighbor report. Instead, the OBSS AP's neighbor report will guide the STA to the anchor AP. The STA may then learn of the identity of the hopping AP via an indication from the anchor AP.

In another example, as the hopping AP performs primary channel hopping, a STA may fail to hop to a new primary channel due to being unaware of the hopping AP's hopping schedule. For example, the STA may fail to receive the hopping schedule broadcasted by the hopping AP due to the STA being in an extended sleep state, a decoding error, or later hand-in (e.g., STA switches to the old primary channel of the hopping AP too late to receive the hopping schedule). Accordingly, in these situations, the STA may fall back to the anchor AP to retrieve the hopping AP's new primary channel information. Alternatively, the hopping schedule may be indicated in an association/probe response message from the hopping AP, as well as from the anchor AP.

In some situations, two or more hopping APs may collide due to the selection of the same new primary channel on which to hop. To mitigate the chance of one AP selecting the same hopping channel at the same time as neighbor hopping APs, a hopping AP may monitor the hopping schedule of the neighbor hopping APs and avoid selecting a primary channel at a time when one or more of the neighbor hopping APs select the same primary channel. Alternatively, the hopping AP may inform the neighbor hopping APs of its hopping schedule. Thus, the neighbor hopping APs may avoid selecting a primary channel at a time when the hopping AP selects the same primary channel. In a further alternative implementation, the hopping AP may disable channel hopping on a short-term basis when detecting the existence of one or more neighbor hopping APs that are also channel hopping on the short-term basis. As described above, the hopping AP monitoring the hopping schedule of the neighbor hopping APs, informing the neighbor hopping APs of its hopping schedule, and detecting the existence of the neighbor hopping APs may all be performed with the assistance of an anchor AP. For example, because the anchor AP provides a stable interface for exchanging information about a hopping AP with other nodes, the anchor AP may assist the hopping AP with monitoring the hopping schedule of the neighbor hopping APs by ascertaining the hopping schedules of each of the neighbor hopping APs and providing the schedules to the hopping AP (e.g., via a neighbor report). In another example, the anchor AP may assist the hopping AP with informing the neighbor hopping APs of its hopping schedule by receiving the hopping AP's hopping schedule and providing the hopping schedule to the neighbor hopping APs (e.g., via a neighbor report). In a further example, the anchor AP may assist the hopping AP with detecting the existence of a neighbor hopping APs by ascertaining whether one or more neighbor hopping APs is capable of channel hopping on a short-term basis and informing the hopping the AP of the existence of the one or more neighbor hopping APs that channel hop on the short-term basis.

One example scanning and hopping operation of a hopping AP will now be described. A hopping AP may initiate scanning for a new primary channel across an entire WiFi bandwidth. For example, the scanning may be initiated if a total load on a current primary channel is greater than a predetermined threshold (e.g., 50%, 60%, 70%, 80%, 90%, etc.) and a total medium usage (MU) of the hopping AP's own BSS nodes (e.g., STAs) is less than a predetermined threshold (e.g., 50%, 40%, 30%, 20%, 10%, etc.). The hopping AP may compare the measured loads to the respective predetermined thresholds, and determine whether to initiate a scan based on the results of the threshold comparisons. The hopping AP may schedule scanning according to the following options.

In a first option, the AP schedules scanning during a common scanning period in which all nodes in the BSS tune to candidate new primary channels to measure load. The scanning schedule may be sent via beacons, probe/association responses, action frames, etc. The scanning schedule may also include a list of the candidate primary channels. The AP may also schedule peer-to-peer (P2P) transmissions during the scanning period to save resources.

Figure 3B:
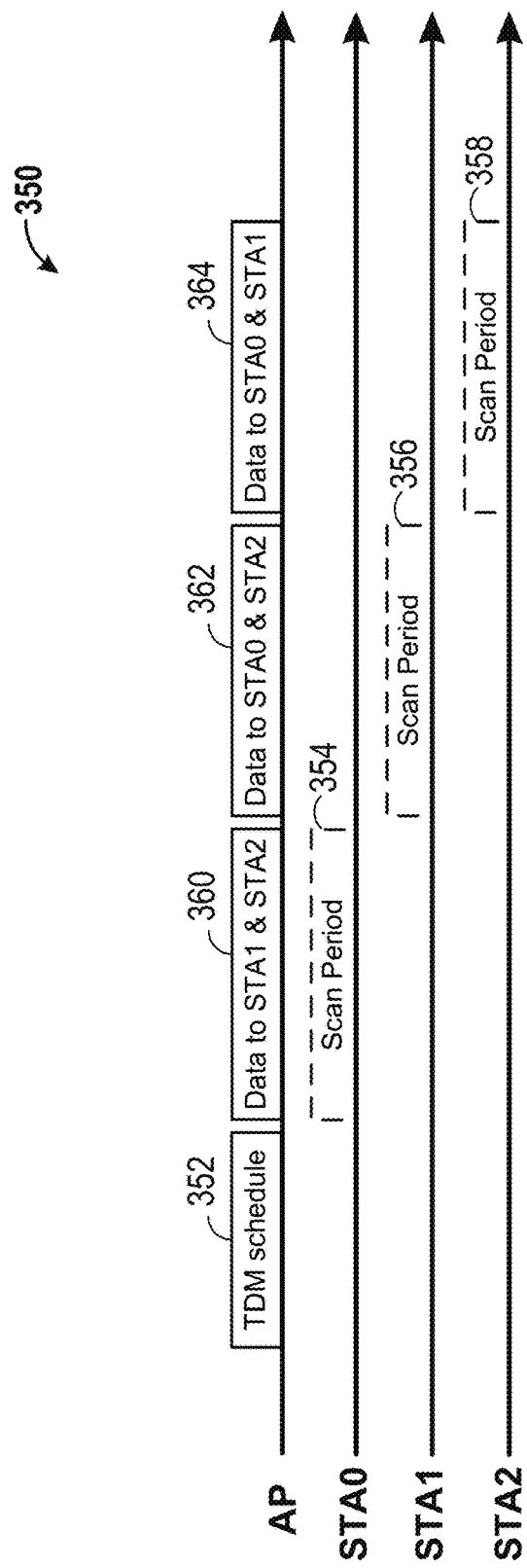
FIG. 3B is a diagram illustrating an access point (AP) scheduling stations (STAs) to scan candidate primary channels according to a time division multiplexing (TDM) scheme.

In a second option, the AP schedules STAs to scan candidate primary channels according to a time division multiplexing (TDM) scheme. FIG. 3B is a diagram 350 illustrating the AP scheduling the STAs according to the TDM scheme. Referring to FIG. 3B, the AP may transmit a TDM scanning schedule 352 to all STAs in the BSS. The TDM scanning schedule 352 may include scan periods corresponding to different time periods, an assignment of STAs to particular scan periods, and a list of candidate primary channels for the STAs to scan. A STA assigned to a particular scan period performs scanning during the assigned scan period. While the assigned STA performs scanning during the scan period, other STAs not assigned to the scan period (e.g., non-scanning STAs) are served by the AP. In an example of the second option, the AP may transmit a TDM scanning schedule 352 to three STAs: STA0, STA1, and STA2. STA0 may be assigned to a first scan period 354, STA1 may be assigned to a second scan period 356, and STA2 may be assigned to a third scan period 358. Accordingly, while STA0 performs scanning of candidate primary channels during the first scan period 354 corresponding to a first time period, the AP may communicate data 360 with STA1 and STA2 during the first time period. Similarly, while STA1 performs scanning of candidate primary channels during the second scan period 356 corresponding to a second time period, the AP may communicate data 362 with STA0 and STA2 during the second time period. And while STA2 performs scanning of candidate primary channels during the third scan period 358 corresponding to a third time period, the AP may communicate data 364 with STA0 and STA1 during the third time period. Uplink traffic may be scheduled during time intervals outside of downlink traffic time intervals.

In a third option, an AP (or STA) scans candidate primary channels with a dedicated scanning hardware device. Use of a dedicated scanning device allows the AP and STA to focus on data communication while the dedicated scanning device performs the load scans. The dedicated scanning device may be co-located together with an AP or a STA, or may be a physically separated device that has a scanning range that overlaps with the service area of the AP.

Based on a load report from all measuring nodes, the hopping AP determines whether a candidate primary channel is "qualified" to be the AP's new operating channel based on the available medium usage (MU) on the candidate primary channel and a current total MU of the hopping AP's own BSS nodes. For example, in one implementation, the candidate channel may be identified as "qualified" when the available medium usage (MU) on the candidate primary channel is greater than a predetermined threshold (e.g., X times, wherein X may be a value of 2) above a current total MU of the hopping AP's own BSS nodes. For a candidate primary channel:

1) Available MU per measuring node=1−(load measured on the candidate primary channel); and
2) Available MU=minimum of Available MU per measuring node, across all measuring nodes.

If multiple "qualified" primary channels exist, the hopping AP may select the primary channel with the highest Available MU. The hopping AP may send out a hopping schedule if a time since a last hop is greater than a predetermined minimum hopping interval threshold (e.g., three minutes, etc.). The hopping schedule may include a target time to hop, the new primary channel, and a bandwidth.

Figure 3C:
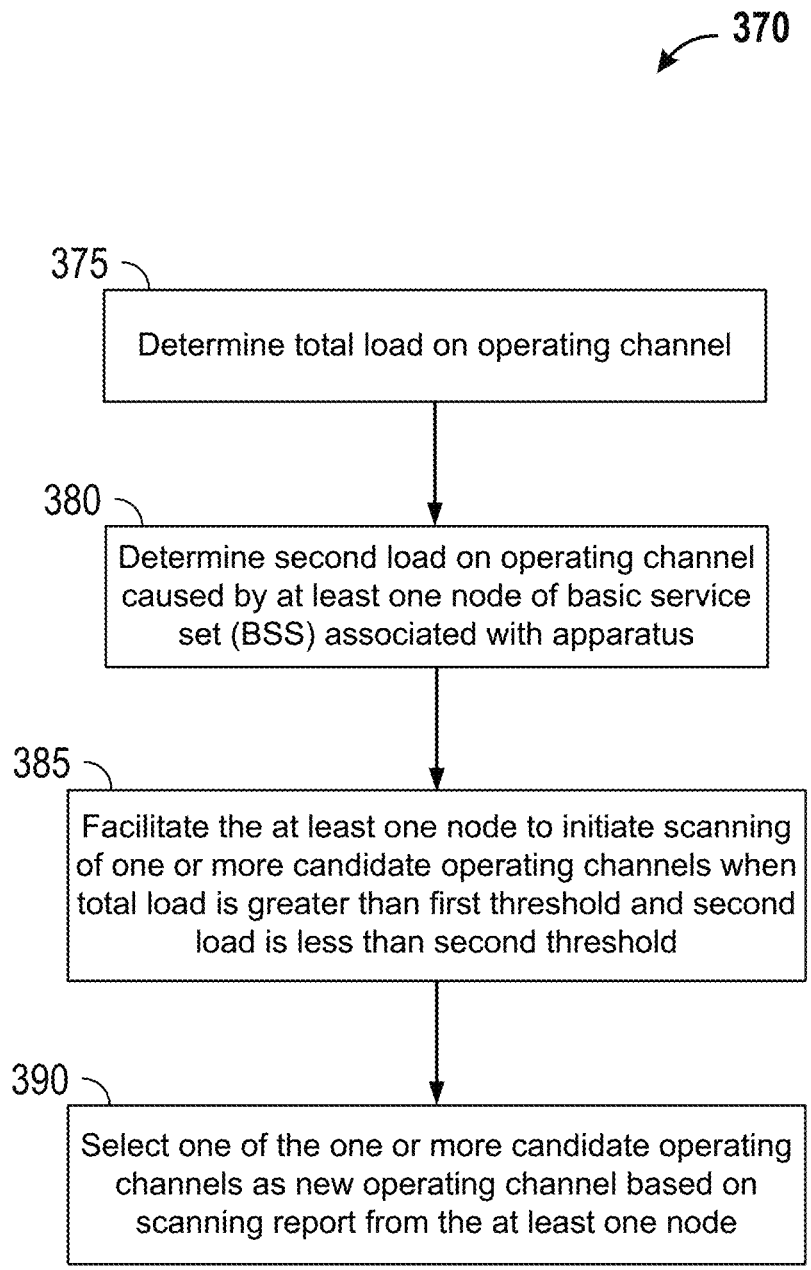
FIG. 3C is a first flowchart of an example method of wireless communication.

FIG. 3C is a flowchart of an example method 370 of wireless communication. The method 370 may be performed using an apparatus (e.g., the wireless device 202 of FIG. 2). For example, the functions described in connection with FIG. 3C may be programmed as particular computer-readable instructions in memory 206. The wireless device 202 may then achieve the described functions when the processor 204 executes the stored instructions programmed into the memory 206. Although the method 370 is described below with respect to the elements of wireless device 202 of FIG. 2, other components may be used to implement one or more of the steps described herein. The apparatus performing the method 370 may be a hopping-capable AP capable of channel hopping on a short-term basis.

At block 375, the apparatus determines a first load (e.g., total load) on an operating channel (e.g., current primary channel). At block 380, the apparatus determines a second load on the operating channel caused by at least one node of a basic service set (BSS) associated with the apparatus. For example, the apparatus may determine the second load by determining a medium usage (MU) on the current primary channel with respect to nodes (e.g., STAs) within the apparatus' own BSS.

At block 385, the apparatus facilitates the at least one node to initiate scanning of one or more candidate operating channels when the first load is greater than a first predetermined threshold (e.g., greater than 80% or another level) and the second load is less than a second predetermined threshold (e.g., less than 20% or another level). In some implementations, the apparatus may facilitate the at least one node to initiate the scanning by scheduling nodes of the BSS to measure a load on the one or more candidate operating channels during a common scanning period. Thereafter, the apparatus may transmit information including the scheduling to the at least one node. In some implementations, the apparatus may facilitate the at least one node to initiate the scanning by assigning nodes of the BSS to measure a load on the one or more candidate operating channels, and scheduling each of the assigned nodes to measure the load on the one or more candidate operating channels during a corresponding scanning period. Thereafter, the apparatus may transmit, to the at least one node, information including an identification of the assigned nodes and the scheduling. The information may also include an identification of the one or more candidate operating channels on which to measure the load.

At block 390, the apparatus selects one of the one or more candidate operating channels as a new operating channel based on a scanning report from the at least one node.

Aspects related to a hopping AP channel hopping on a short-term basis and an anchor AP providing assistance to resolve issues associated with the short-term hopping are described below. The hopping AP and the anchor AP may be co-located APs (e.g., have at least partially overlapping coverage areas), wherein the hopping AP channel hops at a higher rate than the anchor AP (e.g., the hopping AP changes channels on average over a monitored time period more frequently than the anchor AP).

Figure 4:
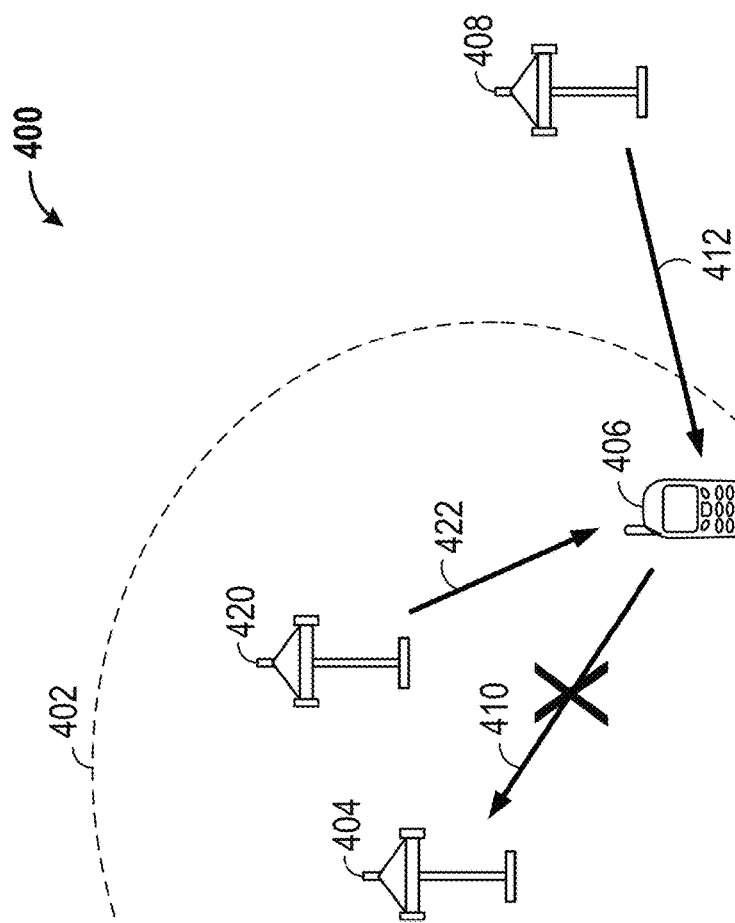
FIG. 4 is a diagram illustrating a STA attempting to scan for a hopping AP.

FIG. 4 is a diagram 400 illustrating a STA attempting to scan for a hopping AP. In FIG. 4, a hopping AP 404 of a basic service area (BSA) 402 may hop to a new primary channel. Overlapping basic service set (OBSS) STAs associated with an OBSS AP 408 may eventually detect the new primary channel of the hopping AP 404. However, the OBSS STAs may not be able to report the new primary channel to the OBSS AP 408 prior to the OBSS AP 408 transmitting an OBSS neighbor report 412. The OBSS neighbor report 412 may be sent via a beacon or a probe/association response message, for example. Accordingly, the OBSS neighbor report 412 will not identify the new primary channel of the hopping AP 404. A new scanning STA 406 receiving the OBSS neighbor report 412 will perform a scan 410 for the hopping AP 404 based on the OBSS neighbor report 412. However, the STA 406 will fail to find the hopping AP 404 since it will have received outdated primary channel information with respect to the hopping AP 404 in the OBSS neighbor report 412. This may trigger the scanning STA 406 to perform a costly full scan for the hopping AP 404.

Aspects of the present disclosure are provided to prevent the STA 406 from performing a full scan for the hopping AP 404. The STA 406 may be redirected to the hopping AP 404 via an anchor AP's up-to-date neighbor report. Referring to FIG. 4, an anchor AP 420 is co-located with the hopping AP 404 in the BSA 402 and may operate on a long-term stationary primary channel. In some implementations, the anchor AP 420 provides a coverage area no less than the hopping AP 404 so that the anchor AP 420 may provide assistance information to the STA 406 in the coverage area of the hopping AP 404. For example, the anchor AP 420 may provide a coverage area that is larger than the coverage area of the hopping AP 404. The anchor AP 420 may operate on the 2.4 GHz bandwidth while the hopping AP 404 may operate on the 5 GHz bandwidth, although use of alternative bandwidths is also available in other implementations. The scanning STA 406 may reliably find the anchor AP 420 based on the OBSS neighbor report 412 from the OBSS AP 408. For example, the anchor AP 420 may be identified in the OBSS neighbor report 412. Once the STA 406 locates the anchor AP 420, the STA 406 may receive a neighbor report 422 from the anchor AP 420. The neighbor report 422 may include current primary channel information of the hopping AP 404. Accordingly, the STA 406 may locate the hopping AP 404 based on the current information, thus avoiding the performance of a full scan.

To prevent the STA 406 from performing a full scan for the hopping AP 404, the OBSS AP 408 may exclude identification of the hopping AP 404 in the OBSS neighbor report 412. The hopping AP 404 may include a hopping AP indicator in a beacon and/or probe/association response message. The anchor AP 420 may also indicate the hopping AP 404 as a hopping AP by identifying the hopping AP 404 in a beacon and/or probe/association response message. OBSS STAs associated with the OBSS AP 408 will detect either of the indications and inform the OBSS AP 408 accordingly. Additionally or alternatively, the OBSS AP 408 may directly detect that the AP 404 is a hopping AP. Upon detecting that the hopping AP 404 is a hopping AP, the OBSS AP 408 will not identify the hopping AP 404 in the OBSS neighbor report 412. Accordingly, the STA 406 is prevented from searching for the hopping AP 404 when performing a scan based on the received OBSS neighbor report 412 since the hopping AP 404 will not appear as an available neighbor AP in the report.

Aspects related to a STA associated with a hopping AP and the STA losing track of a hopping primary channel (e.g., failing to hop to a new primary channel) are described below. A STA may fail to receive a hopping schedule broadcasted by the hopping AP due to the STA being in an extended sleep state, a decoding error, or later hand-in. This may trigger the STA to perform a costly full scan to find the hopping AP. The problem may be pronounced if the hopping AP channel hops on a short-term basis.

When the STA fails to receive the hopping AP's hopping schedule, the STA may fall back to an anchor AP to retrieve the hopping AP's current primary channel information. Mapping between the anchor AP and the hopping AP may first be signaled to the STA. For example, the hopping AP may indicate a corresponding anchor AP identification and primary channel number in a beacon and/or probe/association response message to the STA. Similarly, the anchor AP may indicate a corresponding hopping AP identification in a beacon and/or probe/association response message to the STA.

Once the STA is aware of the mapping between the anchor AP and the hopping AP, the STA will wait to receive the hopping AP's beacon. If the STA does not detect the hopping AP's beacon for a number of cycles, the STA will communicate with the corresponding anchor AP to receive an up-to-date neighbor report. If the hopping AP's primary channel has changed as indicated in the anchor AP's neighbor report, the STA will search for the hopping AP on the new primary channel. However, if the hopping AP's primary channel has not changed as indicated in the anchor AP's neighbor report, then the STA is likely beyond the coverage area of the hopping AP, and the STA should search for another AP with which to associate.

The hopping AP's hopping schedule may also be indicated in the hopping AP's association/probe response message to the STA. The hopping AP's hopping schedule may also be indicated in the anchor AP's beacon and/or association/response message to the STA. The hopping schedule may include a target time to hop, an identification of the new primary channel, and a bandwidth. Accordingly, STAs newly associated with the hopping AP can determine in which frames the hopping AP will hop, even when failing to receive the hopping schedule previously broadcasted by the hopping AP.

In some implementations, a STA (e.g., legacy STA) may not be able to understand the indicated correspondence between the anchor AP and the hopping AP or the indication of the hopping AP's hopping schedule, as described above. Hence, such a STA is not able to fall back to the anchor AP if the STA loses track of the hopping AP's primary channel. Accordingly, aspects of the present disclosure for resolving such issue are described below.

In this situation, the hopping AP may send a neighbor report to the STA, wherein the only AP identified in the neighbor report is the anchor AP corresponding to the hopping AP. Based on the neighbor report, the STA may search for the anchor AP to retrieve information related to the hopping AP when the STA loses track of the hopping AP's primary channel.

In some implementations, the STA may be prevented from associating with the hopping AP. For example, the hopping AP may only allow a STA that is capable of short-term channel hopping to associate with the hopping AP. The STA may be "capable" of short-term channel hopping to associate with the hopping AP if the STA is able to recognize the anchor AP associated with the hopping AP and retrieve the hopping AP's hopping schedule from the anchor AP when the STA loses track of the hopping AP's movement. A STA that is capable of short-term channel hopping may send a "hopping capable STA" indicator in a probe/association request message to the hopping AP. The hopping AP may then send a probe/association response message only to the STAs that provided an indication of being "hopping capable." As such, the STA that is not capable of short-term channel hopping will not receive the probe/association response message from the hopping AP, and will therefore not be able to associate with the hopping AP.

The anchor AP and/or an OBSS AP may not advertise the hopping AP to a STA not capable of short-term channel hopping. For example, the hopping AP may be excluded from a neighbor AP report element sent to the STA. Alternatively, the anchor AP and/or the OBSS AP may advertise the hopping AP's primary channel information in a different message, such as a "neighbor hopping AP report" element, which cannot be understood by the STA not capable of short-term channel hopping.

In some implementations, the hopping AP may disable channel hopping when serving a STA not capable of short-term channel hopping. For example, after associating with one or more STAs not capable of short-term channel hopping, the hopping AP may disable short-term primary channel hopping. The hopping AP then becomes a "regular" AP, and may cease transmission of a "hopping capable" indicator. Moreover, the anchor AP and/or the OBSS AP may advertise the hopping AP as a regular AP in a neighbor report.

A separate AP may be provided to serve one or more STAs not capable of short-term channel hopping. For example, two co-located APs may be deployed to operate on a 5 GHz channel, wherein one AP is a hopping AP and the other AP is a regular AP. A STA not capable of short-term channel hopping may be served by the regular AP, while a STA capable of short-term channel hopping may be served by the hopping AP. In addition, a third co-located anchor AP operating on a 2.4 GHz channel may be deployed along with the two co-located APs operating on the 5 GHz channel.

Aspects related to a collision of multiple hopping APs are described below. In some situations, multiple hopping APs may select the same new primary channel on which to hop during a similar time period. This may occur when two or more hopping APs detect the same most lightly loaded primary channel at the same time and a hopping schedule sent by a hopping AP on a primary channel is not detected by one or more neighbor hopping APs on a different primary channel. No collision may occur if the hopping schedule is detected by the one or more neighbor hopping APs. A neighbor hopping AP may also send its own hopping schedule on its own primary channel. Collision may occur when both hopping APs select the same new primary channel as either of the APs may remain on the new primary channel for a minimum interval.

Aspects related to preventing the collision of multiple hopping APs will now be described. A hopping AP may monitor a hopping schedule of neighbor hopping APs. The hopping schedule of a neighbor hopping AP may be sent by an anchor AP corresponding to the neighbor hopping AP. The neighbor hopping AP's hopping schedule may be sent on a fixed primary channel of the corresponding anchor AP via a beacon and/or probe/association response message. Alternatively, the neighbor hopping AP's hopping schedule may be sent on a commonly agreed discovery channel during a commonly agreed time interval.

The hopping AP (or corresponding anchor AP) and its associated STAs may also monitor a hopping schedule of a neighbor hopping AP sent by an OBSS AP. For example, the hopping schedule may be monitored by periodically monitoring a beacon sent by an OBSS anchor AP. Alternatively, the neighbor hopping AP's hopping schedule may be monitored by monitoring schedules sent on the commonly agreed discovery channel.

If the hopping AP detects that the neighbor hopping AP has scheduled to hop to a new primary channel at a time X for a minimum dwelling interval Y, then the hopping AP may consider not hopping to the new primary channel before a certain time (e.g., time X+interval Y).

In some implementations, the neighbor hopping AP may be informed of the hopping AP's hopping schedule. For example, the hopping AP's hopping schedule may be sent to each neighbor anchor AP. A sender of the hopping schedule may be the hopping AP generating the schedule, an anchor AP corresponding to the hopping AP, or any STA associated with the hopping AP or the anchor AP. The sender may tune to the neighbor anchor AP's long-term stationary primary channel and send the hopping schedule on the long-term stationary primary channel accordingly. Based on the received hopping schedule, the neighbor anchor AP will inform a corresponding neighbor hopping AP not to hop to the same primary channel before a certain time.

In other implementations, a hopping-capable AP may disable hopping if a neighbor hopping AP exists. For example, after hopping is enabled at the neighbor hopping AP, the neighbor hopping AP will transmit a "hopping AP" indicator while a corresponding neighbor anchor AP will transmit an "anchor AP" indicator. An indicator may be sent in a beacon, and/or probe/association response message. When the hopping-capable AP (capable of short-term channel hopping) detects that no neighbor AP transmits the "hopping AP" indicator, and therefore no threat of collision exists, the hopping-capable AP will enable hopping. Otherwise, when the hopping-capable AP detects that the neighbor AP transmits the "hopping AP" indicator, a threat of collision exists, and the hopping-capable AP will disable hopping. The detection may be performed by monitoring beacons of neighbor APs (e.g., neighbor anchor APs) at setup and/or periodically (e.g., once per hour). Moreover, the detection may be performed by the hopping-capable AP itself, an anchor AP corresponding to the hopping-capable AP, and/or one or more STAs associated with the hopping-capable AP or the anchor AP.

As described above, the existence of a hopping AP may cause neighbor hopping-capable APs to disable hopping. Accordingly, aspects related to improving fairness among hopping-capable APs (e.g., facilitating hopping-capable APs to alternate at enabling hopping) will now be described. In one example, each AP may enable hopping only for a maximum duration (e.g., one hour) and disable hopping during a following time interval for a minimum duration (e.g., 5 minutes). Thereafter, a first AP may re-enable hopping if the first AP does not detect a "hopping AP" indicator from any other AP. During the time interval in which the first AP disables hopping, a second neighbor AP may enable hopping if the second neighbor AP does not detect a "hopping AP" indicator from the first AP or any other AP. A time interval in which any AP disables hopping may be signaled to other STAs/APs by a corresponding anchor AP. This allows another AP to enable hopping during a time interval in which all neighbor APs disable hopping.

In another example, hopping-capable APs may enable hopping based on random contention in synchronized time slots. This may be facilitated by AP coordination. A timeframe may be divided into multiple slots having a duration (e.g., one hour). At the beginning of a slot, each hopping-capable AP may select a random time during a time interval (e.g., five minutes). At the selected time, a hopping-capable AP will enable hopping if the hopping-capable AP does not detect a "hopping AP" indicator from any neighbor AP.

Figure 5:
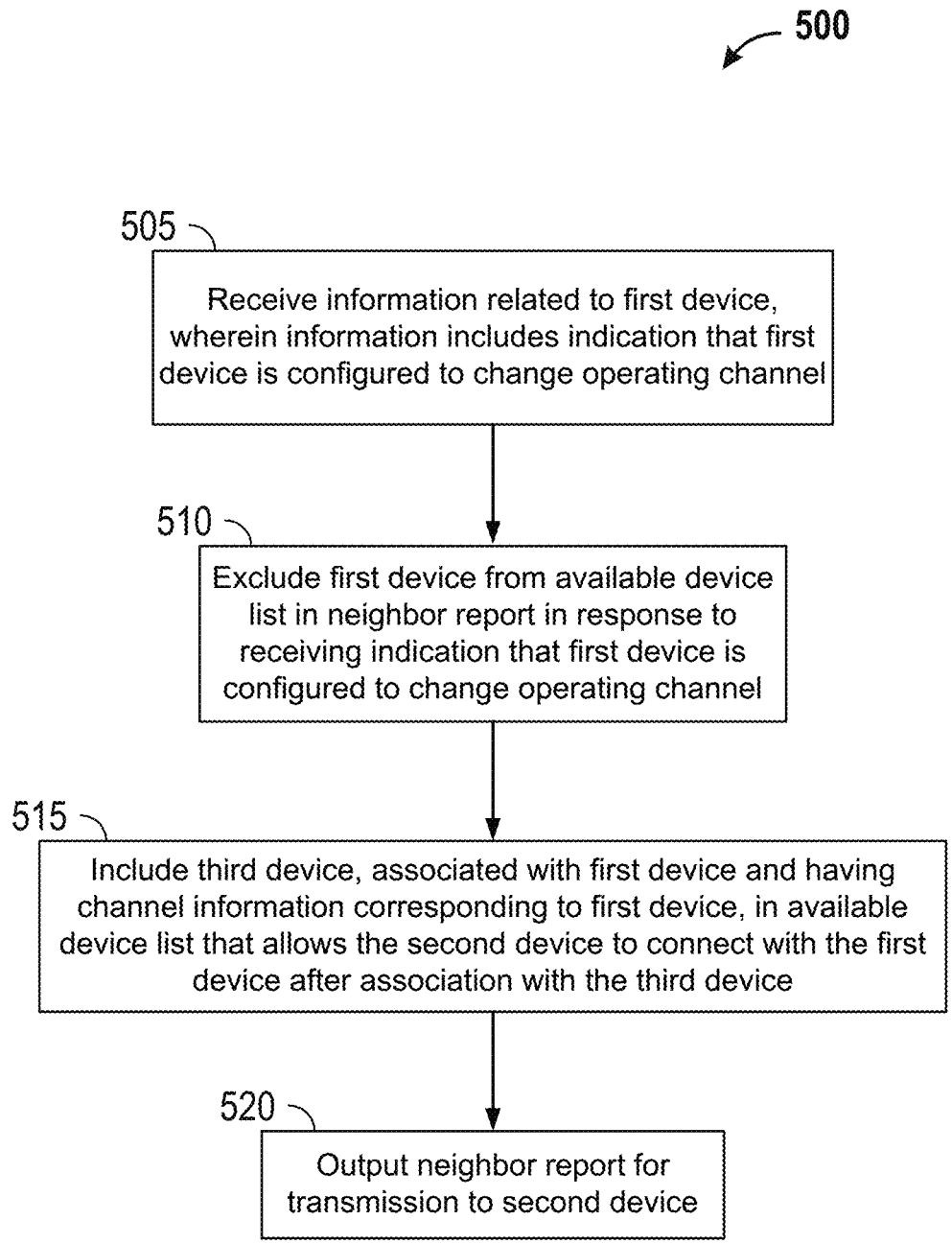
FIG. 5 is a second flowchart of an example method of wireless communication.

FIG. 5 is a flowchart of an example method 500 of wireless communication. The method 500 may be performed using an apparatus (e.g., the wireless device 202 of FIG. 2, anchor AP 420, or OBSS AP 408). For example, the functions described in connection with FIG. 5 may be programmed as particular computer-readable instructions in memory 206. The wireless device 202 may then achieve the described functions when the processor 204 executes the stored instructions programmed into the memory 206. Although the method 500 is described below with respect to the elements of wireless device 202 of FIG. 2, other components may be used to implement one or more of the steps described herein.

The apparatus may be configured to communicate with a station (e.g., STA 106 or STA 406) regarding association between the station and a device (e.g., hopping AP). The apparatus and the device may have overlapping coverage areas and the device may channel hop on a short-term basis (e.g., at a higher rate than the apparatus).

At block 505, the apparatus receives information related to a first device, wherein the information includes an indication that the first device is configured to change its operating channel. At block 510, the apparatus excludes the first device from an available device list in a neighbor report in response to receiving the indication that the first device is configured to change its operating channel.

For example, the apparatus may be an OBSS AP and the first device may be the hopping AP. Moreover, the information may include an indication that the hopping AP channel hops on a short-term basis (e.g., at a higher rate than the apparatus) if a minimum allowed time interval between hops is below a threshold. The OBSS AP may receive the information from the hopping AP, an anchor AP corresponding to the hopping AP, or a STA associated with the OBSS AP. Accordingly, at block 510, the OBSS AP may prevent association between the station and the hopping AP based on the indication by excluding the hopping AP in the neighbor report.

Also for example, the first device may be the hopping AP. The hopping AP may be configured to change its operating channel according to a first minimum time interval (e.g., a minimum time interval between hops). At block 510, the apparatus may exclude the hopping AP from the available neighbor list if the first minimum time interval is less than a threshold (e.g., a predetermined threshold).

At block 515, the apparatus may include a third device (e.g., anchor AP), associated with the first device and having channel information corresponding to the first device, in the available device list that allows a second device (e.g., STA) to connect with the first device after association with the third device.

According to one aspect, the third device (e.g., anchor AP) may be configured to change its operating channel according to a second minimum time interval (e.g., a minimum time interval between hops). At block 515, the apparatus may include the third device in the available device list if the second minimum time interval is greater than a threshold (e.g., a predetermined threshold).

According to another aspect, the first device (e.g., hopping AP) may be configured to change its operating channel according to a first minimum time interval, and the third device (e.g., anchor AP) may be configured to change its operating channel according to a second minimum time interval.

With reference back to block 510, the apparatus may exclude the first device from the available device list if the first minimum time interval (corresponding to the first device) is less than the second minimum time interval (corresponding to the third device).

At block 520, the apparatus outputs the neighbor report for transmission to a second device. For example, the OBSS AP may transmit the neighbor report to the station. Because the hopping AP does not appear in the report as an AP available for association, the station is prevented from searching for the hopping AP when performing a scan based on the received neighbor report.

Figure 6:
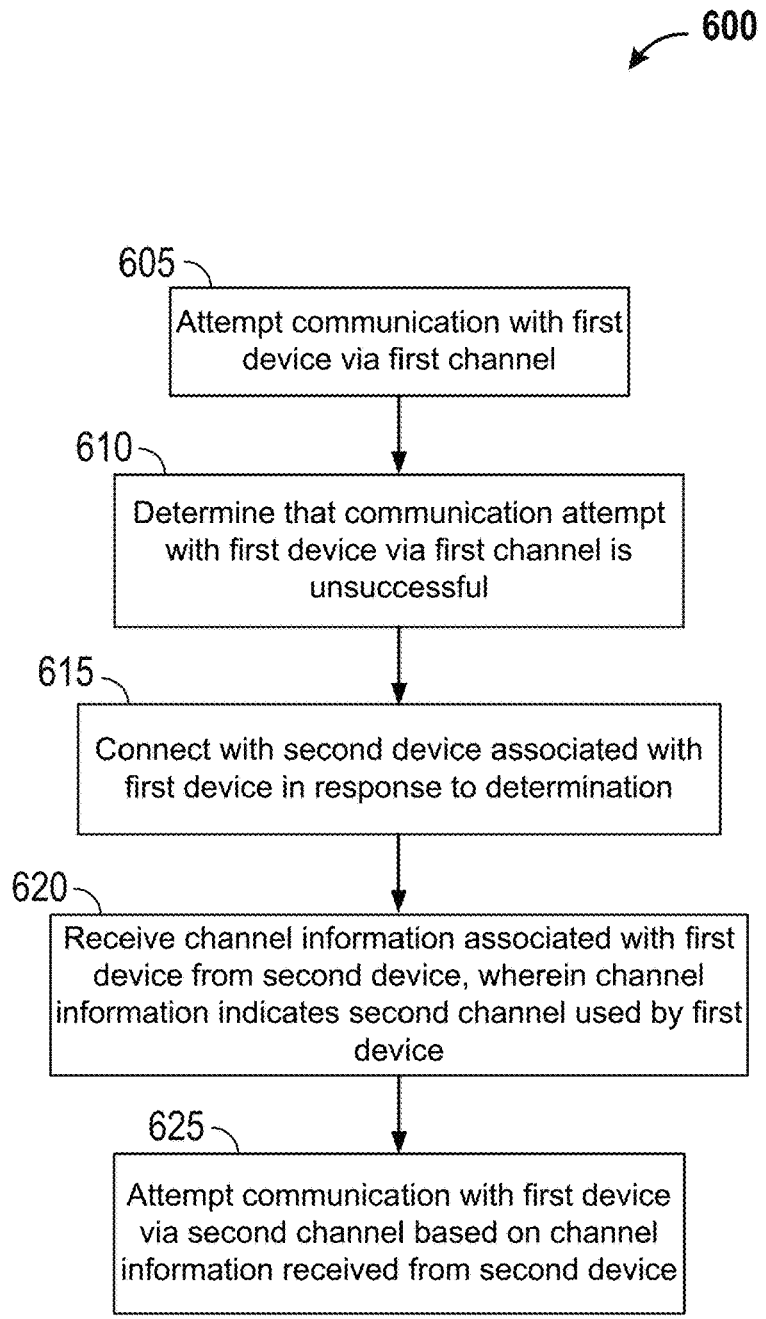
FIG. 6 is a third flowchart of an example method of wireless communication.

FIG. 6 is a flowchart of an example method 600 of wireless communication. The method 600 may be performed using a first apparatus (e.g., the wireless device 202 of FIG. 2, STA 106, or STA 406). For example, the functions described in connection with FIG. 6 may be programmed as particular computer-readable instructions in memory 206. The wireless device 202 may then achieve the described functions when the processor 204 executes the stored instructions programmed into the memory 206. Although the method 600 is described below with respect to the elements of wireless device 202 of FIG. 2, other components may be used to implement one or more of the steps described herein.

The apparatus may be a STA (e.g., STA 106 or STA 406). At block 605, the apparatus attempts communication with a first device (e.g., hopping AP) via a first channel. Herein, an attempt at communication may include the apparatus sending out data or preparing data to be sent out, and does not require the first device to successfully receive the data from the apparatus.

At block 610, the apparatus determines that the communication attempt with the first device via the first channel is unsuccessful. For example, the apparatus makes such determination if the apparatus does not detect a device beacon for a number of beacon cycles, or if the apparatus does not detect a frame from the first device for a period of time.

At block 615, the apparatus connects with the second device associated with the first device in response to the determination that communication with the first device was unsuccessful on the first channel. At block 620, the apparatus receives channel information associated with the first device from the second device. The channel information indicates the second channel used by the first device.

At block 625, the apparatus attempts communication with the first device via the second channel based on the channel information received from the second device. The channel information may include a time for using the second channel to communicate with the first device.

In an aspect, the first device is a hopping access point and the second device is an anchor access point. Accordingly, the apparatus may be further configured to receive an indication that the anchor access point is associated with the hopping access point. Moreover, the apparatus may be configured to connect with the anchor access point by selecting the anchor access point from one or more available access points based on the indication that the anchor access point is associated with the hopping access point.

In a further aspect, the apparatus may be configured to connect with the second device by selecting the second device that is co-located within a same physical housing component as the first device.

In an aspect, a coverage area of the second device may be larger than a coverage area of the first device.

In an aspect, the apparatus is an access terminal, the first device is a hopping access point, and the second device is an anchor access point that supports the hopping access point.

In an aspect, the apparatus may be configured to receive a scanning schedule from the first device, the scanning schedule comprising one or more candidate channels and a scan period corresponding to the apparatus, measure a load on each of the one or more candidate channels during the scan period, and report the measured load on each of the one or more candidate channels to the first device.

In a further aspect, at least one non-scanning apparatus may be scheduled to be served by the first device during the scan period.

In yet another aspect, the apparatus may be configured to connect with the second device by receiving mapping information including a mapping between the first device and the second device. The mapping indicates that the second device is designated for indicating the second channel used by the first device if communication with the first device is unsuccessful on the first channel. The apparatus may further be configured to communicate with the second device in response to a determination that a transmission has not been received from the first device for a period of time that is greater than a predetermined time threshold.

In an aspect, the apparatus (e.g., STA) may receive the channel information from the first device (hopping AP) via a hopping AP association/probe response. In another aspect, the STA may receive the channel information from the second device (anchor AP) via an anchor AP beacon. In some implementations, the hopping AP and the anchor AP have overlapping coverage areas and the hopping AP channel hops at a higher rate than the anchor AP.

The STA may receive the channel information associated with the hopping AP according to the following operation. First, the STA receives mapping information indicating a mapping between the hopping AP and an anchor AP. The STA may communicate with the anchor AP when a transmission is not received from the hopping for a period of time. The STA may then receive a neighbor report from the anchor AP, wherein the neighbor report indicates the second channel associated with the hopping AP. Accordingly, the STA may attempt communication with the hopping AP via the second channel when the indicated second channel is not the same as the first channel. Alternatively, the STA may refrain from communicating with the hopping AP via the second channel when the indicated second channel is the same as the first channel.

The STA may receive the channel information by receiving a neighbor report from the hopping AP. The neighbor report may indicate the anchor AP corresponding to the hopping AP. The neighbor report may further include identification of a channel of the anchor AP. Accordingly, when communication with the hopping AP via the first channel fails, the STA may refrain from communicating with the hopping AP, and determine to communicate with the anchor AP via the channel of the anchor AP.

Figure 7:
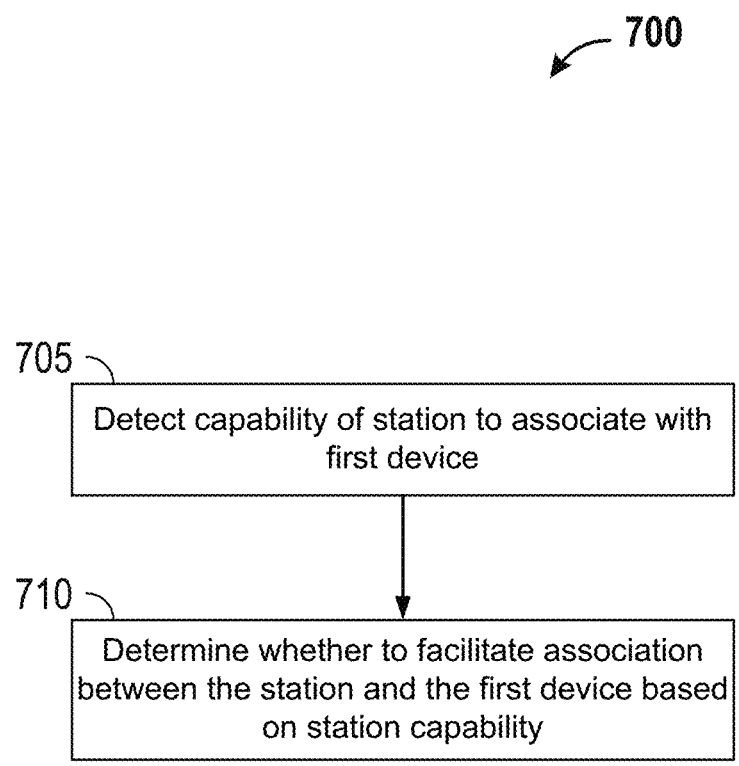
FIG. 7 is a fourth flowchart of an example method of wireless communication.

FIG. 7 is a flowchart of an example method 700 of wireless communication. The method 700 may be performed using an apparatus (e.g., the wireless device 202 of FIG. 2). For example, the functions described in connection with FIG. 7 may be programmed as particular computer-readable instructions in memory 206. The wireless device 202 may then achieve the described functions when the processor 204 executes the stored instructions programmed into the memory 206. Although the method 700 is described below with respect to the elements of wireless device 202 of FIG. 2, other components may be used to implement one or more of the steps described herein.

The apparatus may be configured to communicate with a station (e.g., STA 106 or STA 406) regarding association between the station and a first device. At block 705, the apparatus detects a capability of the station to associate with the first device. The first device has an overlapping coverage area with a second device, wherein the first device channel hops at a higher rate than the second device. At block 710, the apparatus determines whether to facilitate association between the station and the first device based on the capability of the station.

The apparatus may be the first device, which may be a hopping AP capable of channel hopping on a short-term basis. Accordingly, the hopping AP may determine to associate with the station when the station is capable of associating with the hopping AP. In an example, the station is "capable" of associating with the hopping AP if the station is able to recognize an anchor AP associated with the hopping AP and retrieve the hopping AP's hopping schedule from the anchor AP when the station loses track of the hopping AP's movement.

The hopping AP may associate with stations that are not capable of channel hopping at the higher rate. Accordingly, the hopping AP may disable channel hopping at the higher rate when the hopping AP serves such stations.

Alternatively, the apparatus may be the second device, which may be an anchor AP or OBSS AP. Moreover, the first device may be a hopping AP. Accordingly, the anchor AP or OBSS AP may exclude the hopping AP in a neighbor report sent to the station when the station is not capable of associating with the hopping AP. Alternatively, the anchor AP or OBSS AP may detect that the hopping AP has disabled channel hopping at the higher rate. Accordingly, the anchor AP or OBSS AP may identify the hopping AP as a device that does not channel hop at the higher rate in the neighbor report sent to the station.

The apparatus may be the first device, which may be a hopping AP operating on a 5-GHz bandwidth. Accordingly, the hopping AP may associate with the station when the station is capable of associating with the hopping AP.

Alternatively, the apparatus may be the second device, which may be a regular AP operating on a 5-GHz bandwidth, and the first device is the hopping AP. Accordingly, the regular AP may associate with the station when the station is not capable of associating with the hopping AP.

Figure 8:
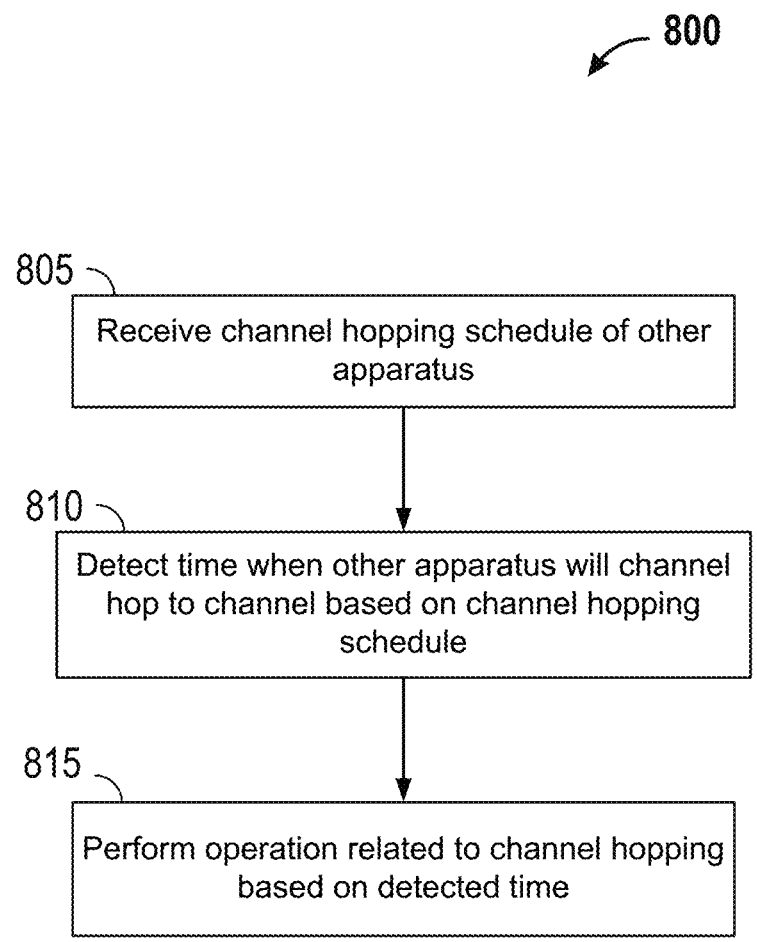
FIG. 8 is a fifth flowchart of an example method of wireless communication.

FIG. 8 is a flowchart of an example method 800 of wireless communication. The method 800 may be performed using a first apparatus (e.g., the wireless device 202 of FIG. 2). For example, the functions described in connection with FIG. 8 may be programmed as particular computer-readable instructions in memory 206. The wireless device 202 may then achieve the described functions when the processor 204 executes the stored instructions programmed into the memory 206. Although the method 800 is described below with respect to the elements of wireless device 202 of FIG. 2, other components may be used to implement one or more of the steps described herein.

At block 805, the first apparatus receives a channel hopping schedule of a second apparatus. At block 810, the first apparatus detects a time when the second apparatus will channel hop to a channel based on the channel hopping schedule. At block 815, the first apparatus performs an operation related to channel hopping based on the detected time.

The first apparatus may be a hopping AP and the second apparatus may be another hopping AP. The hopping AP and the other hopping AP are capable of channel hopping on a short-term basis. Moreover, the channel hopping schedule is received from a neighbor anchor AP corresponding to the other hopping AP. The neighbor anchor AP and the other hopping AP have overlapping coverage areas and the other hopping AP channel hops at a higher rate than the neighbor anchor AP. Furthermore, the apparatus may delay channel hopping to the channel for a period after the detected time.

Alternatively, the first apparatus may be an anchor AP and the second apparatus may be a neighbor hopping AP. The neighbor hopping AP channel hops at a higher rate than the anchor AP. Accordingly, the anchor AP may inform a hopping AP corresponding to the anchor AP not to channel hop to the channel before the end of a period after the detected time. The anchor AP and the hopping AP have overlapping coverage areas and the hopping AP channel hops at a higher rate than the anchor AP.

Figure 9:
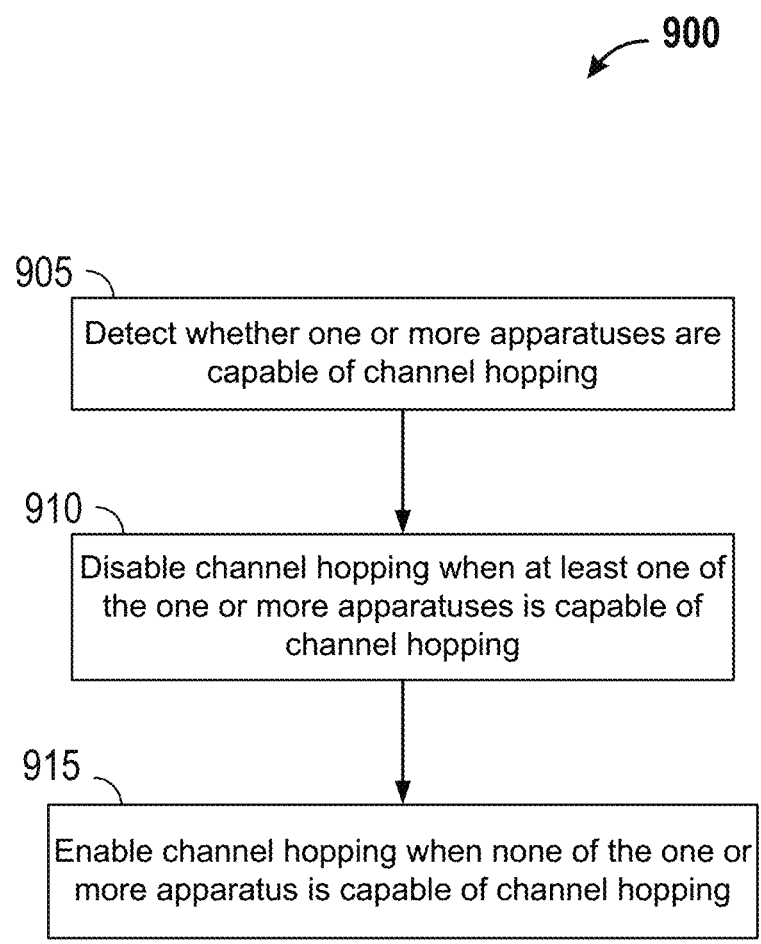
FIG. 9 is a sixth flowchart of an example method of wireless communication.

FIG. 9 is a flowchart of an example method 900 of wireless communication. The method 900 may be performed using an apparatus (e.g., the wireless device 202 of FIG. 2). For example, the functions described in connection with FIG. 9 may be programmed as particular computer-readable instructions in memory 206. The wireless device 202 may then achieve the described functions when the processor 204 executes the stored instructions programmed into the memory 206. Although the method 900 is described below with respect to the elements of wireless device 202 of FIG. 2, other components may be used to implement one or more of the steps described herein.

The apparatus may be a hopping-capable AP capable of channel hopping on a short-term basis. At block 905, the hopping-capable AP detects whether one or more other apparatuses (e.g., one or more APs) are capable of channel hopping. At block 910, the hopping-capable AP disables channel hopping when at least one of the one or more other apparatuses is detected to be capable of channel hopping. At block 915, the hopping-capable AP enables channel hopping when none of the one or more other apparatuses is detected to be capable of channel hopping.

The hopping-capable AP may enable channel hopping for a maximum duration and disables channel hopping for a minimum duration. The hopping-capable AP may enable channel hopping by selecting a time slot for enabling the channel hopping and enables the channel hopping during the selected time slot when none of the one or more other apparatuses is detected to be capable of channel hopping during the selected time slot.

Figure 10:
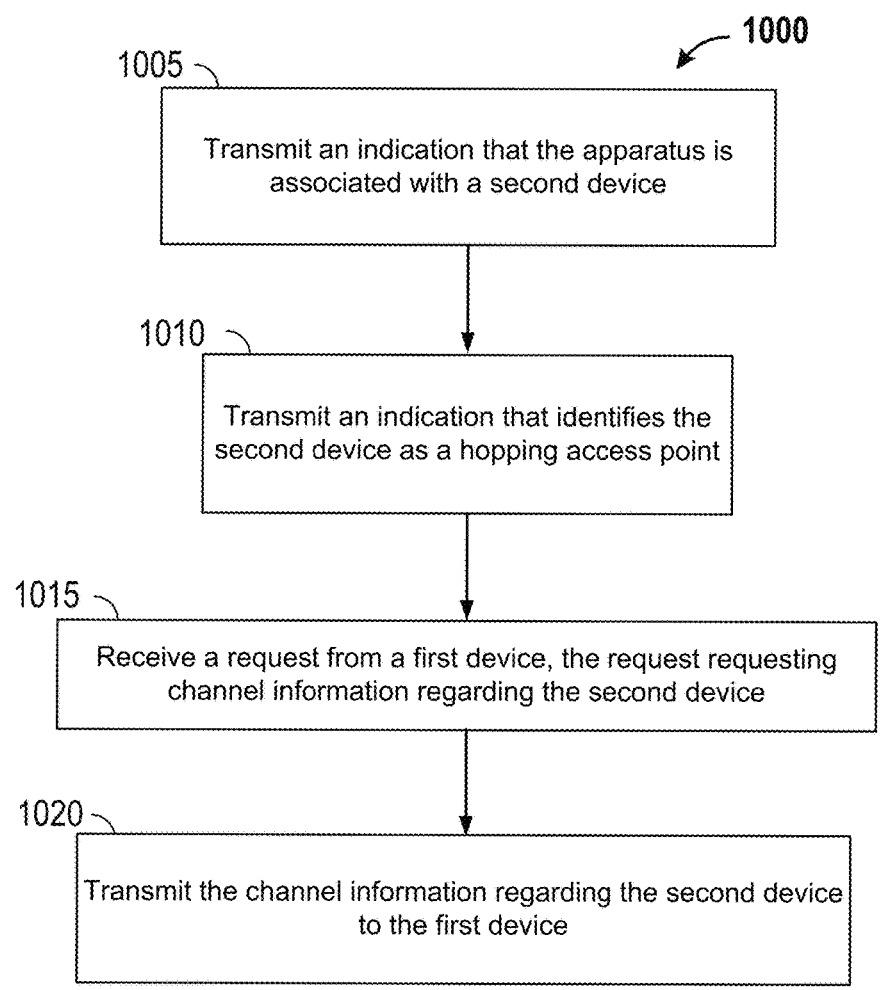
FIG. 10 is a seventh flowchart of an example method of wireless communication.

FIG. 10 is a flowchart of an example method 1000 of wireless communication. The method 1000 may be performed using an apparatus (e.g., the wireless device 202 of FIG. 2, or anchor AP 420). For example, the functions described in connection with FIG. 10 may be programmed as particular computer-readable instructions in memory 206. The wireless device 202 may then achieve the described functions when the processor 204 executes the stored instructions programmed into the memory 206. Although the method 1000 is described below with respect to the elements of wireless device 202 of FIG. 2, other components may be used to implement one or more of the steps described herein.

The apparatus may be an AP (e.g., anchor AP). At block 1015, the apparatus receives a request from a first device (e.g., a STA). The request requests channel information regarding a second device (e.g., a hopping AP) associated with the apparatus. By way of example, the communication may have been sent by the first device in response to a determination that a communication with the second device was unsuccessful.

At block 1020, the apparatus transmits the channel information regarding the second device to the first device to indicate a channel used by the second device and to facilitate an attempt by the first device to communicate with the second device via the indicated channel. According to a further aspect, the channel information includes a time for using the indicated channel to communicate with the second device.

According to a further aspect, at block 1005, the apparatus transmits an indication that the apparatus (e.g., anchor AP) is associated with the second device.

According to a further aspect, at block 1010, the apparatus transmits an indication that identifies the second device as a hopping access point.

According to a further aspect, the apparatus may be co-located within a same physical housing component as the second device. According to a further aspect, the apparatus may have a coverage area that is larger than a coverage area of the second device. According to a further aspect, the apparatus may receive the request from the first device in response to a failed attempt by the first device to connect with the second device on a different channel.

Figure 11:
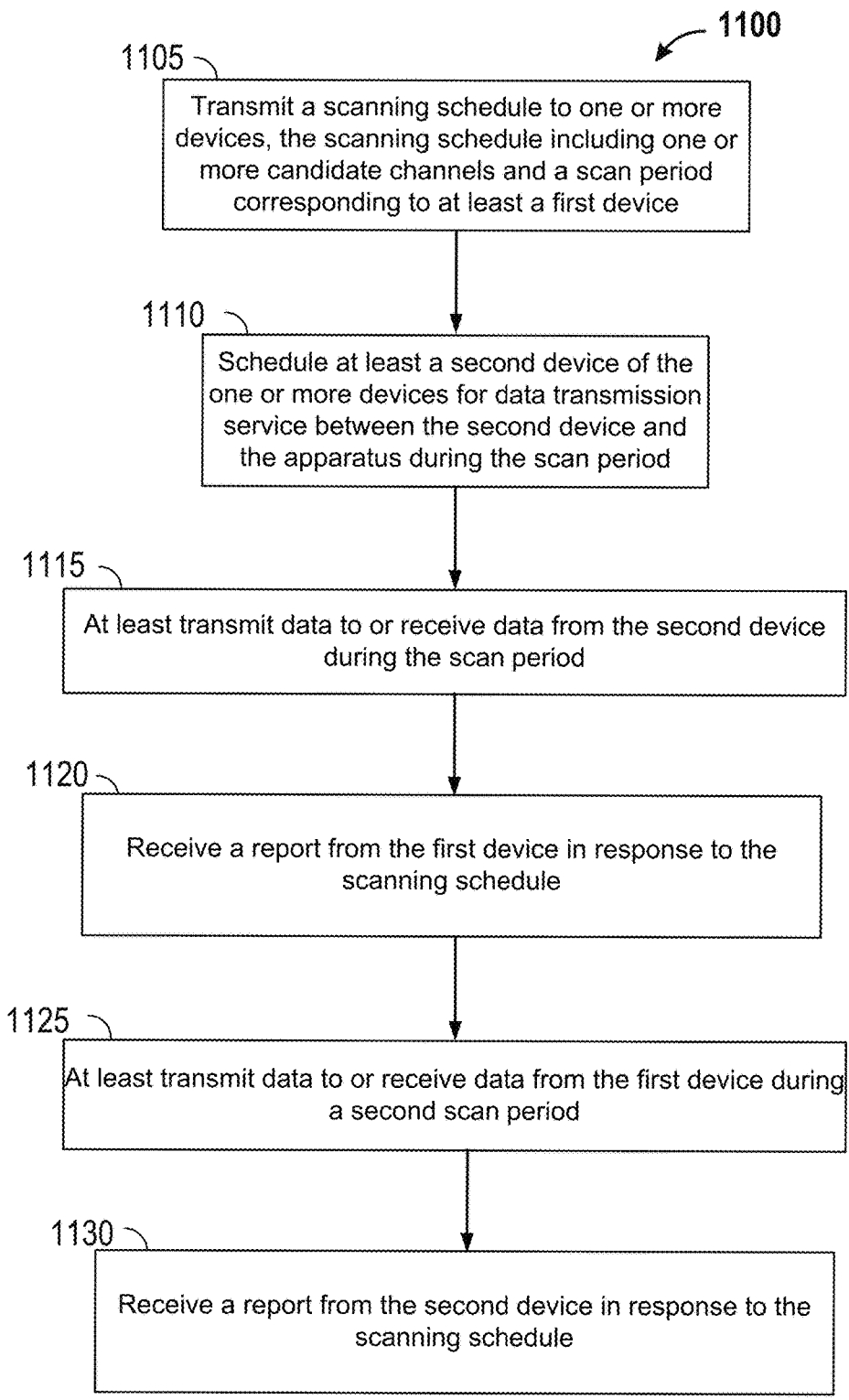
FIG. 11 is an eighth flowchart of an example method of wireless communication.

FIG. 11 is a flowchart of an example method 1100 of wireless communication. The method 1100 may be performed using an apparatus (e.g., the wireless device 202 of FIG. 2, AP 104, or hopping AP 404). For example, the functions described in connection with FIG. 11 may be programmed as particular computer-readable instructions in memory 206. The wireless device 202 may then achieve the described functions when the processor 204 executes the stored instructions programmed into the memory 206. Although the method 1100 is described below with respect to the elements of wireless device 202 of FIG. 2, other components may be used to implement one or more of the steps described herein.

The apparatus may be an AP. For example, the apparatus may be a hopping AP. For example, the apparatus may be an anchor AP that supports a channel hopping operation of a hopping AP. At block 1105, the apparatus transmits a scanning schedule to one or more devices (e.g., STA 406). The scanning schedule includes one or more candidate channels and a scan period corresponding to at least a first device of the one or more devices. At block 1120, the apparatus receives a report from the first device in response to the scanning schedule. The report indicates a load on at least one of the one or more candidate channels during the scan period.

According to a further aspect, at block 1110, the apparatus may schedule at least a second device of the one or more devices for data transmission service between the second device and the apparatus during the scan period associated with a load scanning operation by the first device. For example, the apparatus may schedule the second device by arranging for the second device to be served during the scan period, and transmitting corresponding signaling to the second device. According to yet a further aspect, at block 1115, the apparatus may at least transmit data to or receive data from the second device during the scan period.

According to a further aspect, with reference back to block 1105, the scanning schedule may further include a second scan period that corresponds to at least a second device of the one or more devices. According to yet a further aspect, at block 1130, the apparatus receives a report from the second device in response to the scanning schedule. The report indicates a load on at least one of the one or more candidate channels during the second scan period.

According to yet a further aspect, similar to the scheduling at block 1110, the apparatus may schedule the first device for data transmission service between the first device and the apparatus during the second scan period associated with a load scanning operation by the second device. According to yet a further aspect, at block 1125, the apparatus may at least transmit data to or receive data from the first device during the second scan period.

Figure 12:
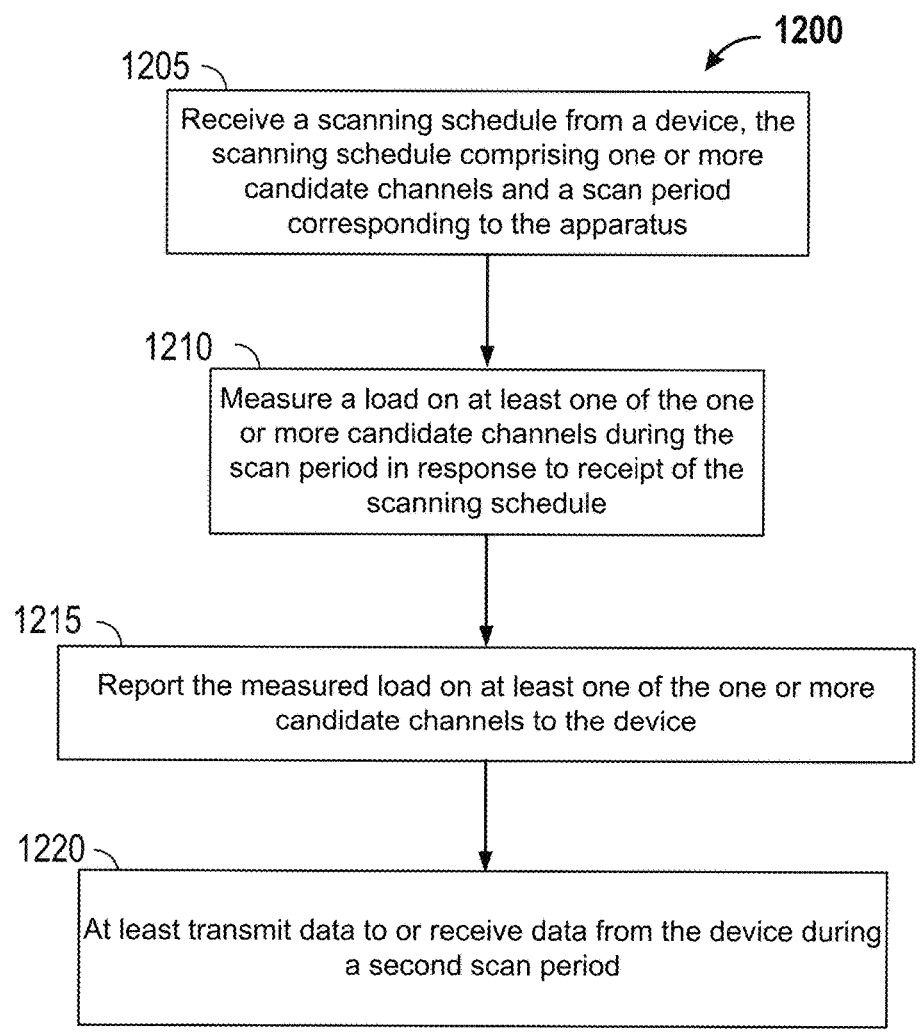
FIG. 12 is a ninth flowchart of an example method of wireless communication.

FIG. 12 is a flowchart of an example method 1200 of wireless communication. The method 1200 may be performed using an apparatus (e.g., the wireless device 202 of FIG. 2, STA 106, STA 406). For example, the functions described in connection with FIG. 12 may be programmed as particular computer-readable instructions in memory 206. The wireless device 202 may then achieve the described functions when the processor 204 executes the stored instructions programmed into the memory 206. Although the method 1200 is described below with respect to the elements of wireless device 202 of FIG. 2, other components may be used to implement one or more of the steps described herein.

The apparatus may be a STA (e.g., STA 106, STA 406). At block 1205, the apparatus receives a scanning schedule from a device (e.g., AP 104, hopping AP 404, anchor AP). The device may be an anchor AP that supports a channel hopping operation of a hopping AP. The scanning schedule includes one or more candidate channels and a scan period corresponding to the apparatus. At block 1210, the apparatus measures a load on at least one of the one or more candidate channels during the scan period in response to receipt of the scanning schedule. At block 1215, the apparatus reports the measured load on at least one of the one or more candidate channels to the device.

According to a further aspect, the scanning schedule may include a second scan period corresponding to another apparatus. The apparatus may be scheduled for data transmission service between the apparatus and the device during the second scan period associated with a load scanning operation by a second apparatus. According to yet a further aspect, at block 1220, the apparatus may at least transmit data to or receive data from the device during the second scan period.

The receiver 212, the processor 204 and/or the transmitter 210 may be configured to perform one or more functions discussed above with respect to blocks 375, 380, 385, and 390 of FIG. 3C, blocks 505, 510, 515, and 520 of FIG. 5, blocks 605, 610, 615, 620, and 625 of FIG. 6, blocks 705 and 710 of FIG. 7, blocks 805, 810, and 815 of FIG. 8, blocks 905, 910, and 915 of FIG. 9, blocks 1005, 1010, 1015, and 1020 of FIG. 10, blocks 1105, 1110, 1115, 1120, 1125, and 1130 of FIG. 11, and blocks 1205, 1210, 1215 and 1220 of FIG. 12.

The various operations of methods described above may be performed by any suitable means capable of performing the operations, such as various hardware and/or software component(s), circuits, and/or module(s). Generally, any operations illustrated in the figures may be performed by corresponding functional means capable of performing the operations.

Moreover, means for determining a first load on an operating channel may comprise the receiver 212 and/or the processor 204 executing one or more algorithms. Means for determining a second load on the operating channel caused by at least one node of a basic service set (BSS) associated with a device may comprise the receiver 212 and/or the processor 204 executing one or more algorithms. Means for facilitating the at least one node to initiate scanning of one or more candidate operating channels when the first load is greater than a first predetermined threshold and the second load is less than a second predetermined threshold may comprise the receiver 212, the processor 204, and/or the transmitter 210 executing one or more algorithms. Means for selecting one of the one or more candidate operating channels as a new operating channel based on a scanning report from the at least one node may comprise the receiver 212, the processor 204 and/or the transmitter 210 executing one or more algorithms.

In some implementations, means for receiving information related to a first device may comprise the receiver 212 and/or the processor 204 executing one or more algorithms. Means for excluding the first device from an available device list in a neighbor in response to receiving the indication that the first device is configured to change its operating channel may comprise the processor 204 executing one or more algorithms. Means for including a third device, associated with the first device and having channel information corresponding to the first device, in the available device list that allows a second device to connect with the first device after association with the third device may comprise the processor 204 executing one or more algorithms. Means for outputting the neighbor report for transmission to the second device may comprise the processor 204 and/or the transmitter 210 executing one or more algorithms.

In some implementations, means for attempting communication with a first device via a first channel may comprise the receiver 212, the processor 204, and/or the transmitter 210 executing one or more algorithms. Means for connecting with a second device associated with the first device in response to a determination that communication with the first device was unsuccessful on the first channel may comprise the receiver 212, the processor 204, and/or the transmitter 210 executing one or more algorithms. Means for receiving channel information associated with the first device from the second device, wherein the channel information indicates a second channel used by the first device may comprise the receiver 212 and/or the processor 204 executing one more algorithms. Means for attempting communication with the second device via the second channel based on the channel information may comprise the receiver 212, the processor 204, and/or the transmitter 210 executing one or more algorithms.

In some implementations, means for receiving an indication that the anchor access point is associated with the hopping access point, means for connecting with the anchor access point by selecting the anchor access point from one or more available access points based on the indication that the anchor access point is associated with the hopping access point, means for receiving a scanning schedule from the first device, the scanning schedule comprising one or more candidate channels and a scan period corresponding to the apparatus, means for measuring a load on each of the one or more candidate channels during the scan period, means for reporting the measured load on each of the one or more candidate channels to the first device, means for receiving mapping information including a mapping between the first device and the second device, wherein the mapping indicates that the second device is designated for indicating the second channel used by the first device if communication with the first device is unsuccessful on the first channel, and means for communicating with the second device in response to a determination that a transmission has not been received from the first device for a period of time that is greater than a predetermined time threshold may comprise the receiver 212, the processor 204, and/or the transmitter 210 executing one or more algorithms.

In some implementations, means for determining that the communication with the device via the first primary channel has failed if a device beacon is not detected for a number of beacon cycles or if a frame from the device is not detected for a period of time may comprise the receiver 212 and/or the processor 204 executing one or more algorithms. Means for refraining from communicating with the device via the second primary channel if the second primary channel is the same as the first primary channel may comprise the receiver 212, the processor 204, and/or the transmitter 210 executing one or more algorithms. Means for receiving channel changing scheduling information may comprise the receiver 212 and/or the processor 204 executing one or more algorithms.

In some implementations, means for detecting a capability of a station to associate with a first device, wherein the first device has an overlapping coverage area with a second device and the first device channel hops at a higher rate than the second device may comprise the receiver 212 and/or the processor 204 executing one or more algorithms. Means for determining whether to facilitate association between the station and the first device based on the capability of the station may comprise the transmitter 210 and/or the processor 204 executing one or more algorithms.

In some implementations, means for receiving a channel hopping schedule of another apparatus may comprise the receiver 212 executing one more algorithms. Means for detecting a time when the other apparatus will channel hop to a channel based on the channel hopping schedule may comprise the receiver 212 and/or the processor 204 executing one or more algorithms. Means for performing an operation related to channel hopping based on the detected time may comprise the transmitter 210 and/or the processor 204 executing one or more algorithms.

In some implementations, means for detecting whether one or more other devices is capable of channel hopping may comprise the receiver 212 and/or the processor 204 executing one or more algorithms. Means for disabling channel hopping when at least one of the one or more other devices is detected to be capable of channel hopping may comprise the processor 204 executing one or more algorithms. Means for enabling channel hopping when none of the one or more other apparatuses is detected to be capable of channel hopping may comprise the processor 204 executing one or more algorithms.

In some implementations, means for receiving a request from a first device may include the receiver 212 and/or the processor 204 executing one or more algorithms. Means for transmitting channel information regarding a second device to the first device may include the transmitter 210 and/or the processor 204 executing one or more algorithms. In further implementations, means for transmitting an indication that the anchor access point is associated with the second device may include the transmitter 210 and/or the processor 204 executing one or more algorithms. In further implementations, means for transmitting an indication that identifies the second device as a hopping AP may include the transmitter 210 and/or the processor 204 executing one or more algorithms.

In some implementations, means for transmitting a scanning schedule to one or more devices may include the transmitter 210 and/or the processor 204 executing one or more algorithms. Means for receiving a report from a first device in response to the scanning schedule may include the receiver 212 and/or the processor 204 executing one or more algorithms. In further implementations, means for scheduling at least a second device for data transmission service between the second device and an apparatus during the scan period may include the transmitter 210, the receiver 212 and/or the processor 204 executing one or more algorithms. In further implementation, means for transmitting data to the second device during the scan period may include the transmitter 210 and/or the processor 204 executing one or more algorithms, and/or means for receiving data from the second device during the scan period may include the receiver 212 and/or the processor 204 executing one or more algorithms. In further implementations, means for receiving a report from the second device in response to the scanning schedule may include the receiver 212 and/or the processor 204 executing one or more algorithms. In further implementation, means for transmitting data to the first device during the second scan period may include the transmitter 210 and/or the processor 204 executing one or more algorithms, and/or means for receiving data from the first device during the second scan period may include the receiver 212 and/or the processor 204 executing one or more algorithms.

In some implementations, means for receiving a scanning schedule from a device may include the receiver 212 and/or the processor 204 executing one or more algorithms. Means for measuring a load on at least one of the one or more candidate channels during the scan period in response to receipt of the scanning schedule may include the receiver 212 and/or the processor 204 executing one or more algorithms. Means for reporting the measured load on at least one of the one or more candidate channels to the device may include the transmitter 210 and/or the processor 204 executing one or more algorithms. In further implementations, means for transmitting data to the device during a second scan period may include the transmitter 210 and/or the processor 204 executing one or more algorithms, and/or means for receiving data from the device during the second scan period may include the receiver 212 and/or the processor 204 executing one or more algorithms.

As used herein, the term "associate," or "association," or any variant thereof should be given the broadest meaning possible within the context of the present disclosure. By way of example, when a first apparatus associates with a second apparatus, it should be understood that the two apparatus may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A or B or C, or A and B, or A and C, or B and C, or A, B and C, or 2A, or 2B, or 2C, and so on.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if the software is transmitted from a website, server, or other remote source using a coaxial cable, fiber optic cable, twisted pair, digital subscriber line (DSL), then the coaxial cable, fiber optic cable, twisted pair, or DSL are included in the definition of medium. The software may also be transmitted from the website, server, or other remote source using wireless technologies such as infrared, radio, and microwave. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, computer readable medium may comprise non-transitory computer readable medium (e.g., tangible media). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Certain implementations may comprise a computer program product for performing the operations presented herein. For example, such a computer program product may comprise a computer readable medium having instructions stored (and/or encoded) thereon, the instructions being executable by one or more processors to perform the operations described herein. For certain implementations, the computer program product may include packaging material.

It should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage media, such that a user terminal and/or base station can obtain the various methods upon coupling or providing a storage medium to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communication, comprising:
   memory; and
   a processor coupled to the memory and configured to:
      receive information related to a first device, wherein the information includes an indication that the first device is configured to change a current operating channel;
      exclude the first device from an available device list in a neighbor report in response to receiving the indication that the first device is configured to change the current operating channel;
      include a third device in the available device list, the third device associated with the first device and having channel information corresponding to the first device that allows a second device to connect with the first device after the second device associates with the third device; and
      output the neighbor report for transmission to the second device.

2. The apparatus of claim 1, wherein the first device is configured to change the current operating channel according to a minimum time interval, and wherein the processor is further configured to exclude the first device from the available device list based on a determination that the minimum time interval is less than a predetermined threshold.

3. The apparatus of claim 1, wherein the apparatus is an access point, the first device is a hopping access point, the second device is an access terminal, and the third device is an anchor access point that supports the hopping access point.

4. The apparatus of claim 1, wherein the third device is configured to change the third device's operating channel according to a minimum time interval, and wherein the processor is further configured to include the third device in the available device list based on a determination that the minimum time interval is greater than a predetermined threshold.

5. The apparatus of claim 1, wherein the first device is configured to change the current operating channel according to a first minimum time interval, wherein the third device is configured to change the third device's operating channel according to a second minimum time interval, and wherein the processor is further configured to exclude the first device from the available device list based on a determination that the first minimum time interval is less than the second minimum time interval.

6. The apparatus of claim 1, wherein the processor is further configured to exclude the first device by being configured to exclude the first device from the available device list in response to a determination that the indication identifies that the first device is configured to change the current operating channel according to a minimum time interval that is below a predetermined minimum time interval threshold.

7. A method of wireless communication at an apparatus, comprising:
   receiving information related to a first device, wherein the information includes an indication that the first device is configured to change a current operating channel;
   excluding the first device from an available device list in a neighbor report in response to receiving the indication that the first device is configured to change the current operating channel;
   including a third device in the available device list, the third device associated with the first device and having channel information corresponding to the first device that allows a second device to connect with the first device after the second device associates with the third device; and
   outputting the neighbor report for transmission to the second device.

8. The method of claim 7, wherein the first device is configured to change the current operating channel according to a minimum time interval, and wherein the excluding the first device comprises excluding the first device from the available device list based on a determination that the minimum time interval is less than a predetermined threshold.

9. The method of claim 7, wherein the apparatus is an access point, the first device is a hopping access point, the second device is an access terminal, and the third device is an anchor access point that supports the hopping access point.

10. The method of claim 7, wherein the third device is configured to change the third device's operating channel according to a minimum time interval, and wherein the including the third device comprises including the third device in the available device list based on a determination that the minimum time interval is greater than a predetermined threshold.

11. The method of claim 7, wherein the first device is configured to change the current operating channel according to a first minimum time interval, wherein the third device is configured to change the third device's operating channel according to a second minimum time interval, and wherein the excluding the first device comprises excluding the first device from the available device list based on a determination that the first minimum time interval is less than the second minimum time interval.

12. The method of claim 7, wherein the excluding the first device comprises excluding the first device from the available device list in response to a determination that the indication identifies that the first device is configured to change the current operating channel according to a minimum time interval that is below a predetermined minimum time interval threshold.

13. An apparatus for wireless communication, comprising:
means for receiving information related to a first device, wherein the information includes an indication that the first device is configured to change a current operating channel;
means for excluding the first device from an available device list in a neighbor report in response to receiving the indication that the first device is configured to change the current operating channel;
means for including a third device in the available device list, the third device associated with the first device and having channel information corresponding to the first device that allows a second device to connect with the first device after the second device associates with the third device; and
means for outputting the neighbor report for transmission to the second device.

14. The apparatus of claim 13, wherein the first device is configured to change the current operating channel according to a minimum time interval, and wherein the means for excluding the first device is configured to exclude the first device from the available device list based on a determination that the minimum time interval is less than a predetermined threshold.

15. The apparatus of claim 13, wherein the apparatus is an access point, the first device is a hopping access point, the second device is an access terminal, and the third device is an anchor access point that supports the hopping access point.

16. The apparatus of claim 13, wherein the third device is configured to change the third device's operating channel according to a minimum time interval, and wherein the means for including the third device is configured to include the third device in the available device list based on a determination that the minimum time interval is greater than a predetermined threshold.

17. The apparatus of claim 13, wherein the first device is configured to change the current operating channel according to a first minimum time interval, wherein the third device is configured to change the third device's operating channel according to a second minimum time interval, and wherein the means for excluding the first device is configured to exclude the first device from the available device list based on a determination that the first minimum time interval is less than the second minimum time interval.

18. The apparatus of claim 13, wherein the means for excluding the first device is configured to exclude the first device from the available device list in response to a determination that the indication identifies that the first device is configured to change the current operating channel according to a minimum time interval that is below a predetermined minimum time interval threshold.

19. A non-transitory computer-readable medium storing computer executable code for wireless communication at an apparatus, comprising code for:
receiving information related to a first device, wherein the information includes an indication that the first device is configured to change a current operating channel;
excluding the first device from an available device list in a neighbor report in response to receiving the indication that the first device is configured to change the current operating channel;
including a third device in the available device list, the third device associated with the first device and having channel information corresponding to the first device that allows a second device to connect with the first device after the second device associates with the third device; and
outputting the neighbor report for transmission to the second device.

20. The non-transitory computer-readable medium of claim 19, wherein the first device is configured to change the current operating channel according to a minimum time interval, and wherein the code for excluding the first device is configured to exclude the first device from the available device list based on a determination that the minimum time interval is less than a predetermined threshold.

21. The non-transitory computer-readable medium of claim 19, wherein the apparatus is an access point, the first device is a hopping access point, the second device is an access terminal, and the third device is an anchor access point that supports the hopping access point.

22. The non-transitory computer-readable medium of claim 19, wherein the third device is configured to change the third device's operating channel according to a minimum time interval, and wherein the code for including the third device is configured to include the third device in the available device list based on a determination that the minimum time interval is greater than a predetermined threshold.

23. The non-transitory computer-readable medium of claim 19, wherein the first device is configured to change the current operating channel according to a first minimum time interval, wherein the third device is configured to change the third device's operating channel according to a second minimum time interval, and wherein the code for excluding the first device is configured to exclude the first device from the available device list based on a determination that the first minimum time interval is less than the second minimum time interval.

24. The non-transitory computer-readable medium of claim 19, wherein the code for excluding the first device is configured to exclude the first device from the available device list in response to a determination that the indication identifies that the first device is configured to change the current operating channel according to a minimum time interval that is below a predetermined minimum time interval threshold.

* * * * *